(12) United States Patent
Nam et al.

(10) Patent No.: US 11,556,850 B2
(45) Date of Patent: Jan. 17, 2023

(54) RESOURCE-AWARE AUTOMATIC MACHINE LEARNING SYSTEM

(71) Applicant: Accenture Global Solutions Limited, Dublin (IE)

(72) Inventors: Andrew Nam, San Francisco, CA (US); Yao Yang, San Francisco, CA (US); Teresa Sheausan Tung, Tustin, CA (US); Mohamad Mehdi Nasr-Azadani, Menlo Park, CA (US); Zaid Tashman, San Francisco, CA (US); Ruiwen Li, San Francisco, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 449 days.

(21) Appl. No.: 16/749,717

(22) Filed: Jan. 22, 2020

(65) Prior Publication Data
US 2021/0110302 A1    Apr. 15, 2021

Related U.S. Application Data

(60) Provisional application No. 62/913,554, filed on Oct. 10, 2019.

(51) Int. Cl.
*G06N 20/00* (2019.01)
*G06F 9/30* (2018.01)
(Continued)

(52) U.S. Cl.
CPC ......... *G06N 20/00* (2019.01); *G06F 9/30065* (2013.01); *G06K 9/6278* (2013.01); *G06N 7/005* (2013.01)

(58) Field of Classification Search
CPC ........ G06N 5/003; G06N 20/00; G06N 7/005; G06N 3/082; G06N 3/0454; G06N 3/126; G06F 9/30065; G06K 9/6278
(Continued)

(56) References Cited

U.S. PATENT DOCUMENTS

| | | | | |
|---|---|---|---|---|
| 7,603,326 B2* | 10/2009 | Bonabeau | ............ | G06N 3/126 706/13 |
| 2008/0312895 A1* | 12/2008 | Sastry | ............ | G16C 10/00 703/12 |
| 2019/0042887 A1* | 2/2019 | Nguyen | ............ | G06K 9/6257 |
| 2019/0138901 A1* | 5/2019 | Meyer | ............ | G06N 3/08 |

(Continued)

OTHER PUBLICATIONS

Extended European Search Report in Europe Application No. 20195020.1, dated Mar. 5, 2021, 12 pages.
(Continued)

*Primary Examiner* — Chun Kuan Lee
(74) *Attorney, Agent, or Firm* — Crowell & Moring LLP

(57) ABSTRACT

The present disclosure relates to a system, a method, and a product for optimizing hyper-parameters for generation and execution of a machine-learning model under constraints. The system includes a memory storing instructions and a processor in communication with the memory. When executed by the processor, the instructions cause the processor to obtain input data and an initial hyper-parameter set; for an iteration, to build a machine learning model based on the hyper-parameter set, evaluate the machine learning model based on the target data to obtain a performance metrics set, and determine whether the performance metrics set satisfies the stopping criteria set. If yes, the instructions cause the processor to perform an exploitation process to obtain an optimal hyper-parameter set, and exit the iteration; if no, perform an exploration process to obtain a next hyper-parameter set, and perform a next iteration with using the next hyper-parameter set as the hyper-parameter set.

17 Claims, 26 Drawing Sheets

(51) Int. Cl.
*G06K 9/62* (2022.01)
*G06N 7/00* (2006.01)

(58) Field of Classification Search
USPC .......................................................... 706/12
See application file for complete search history.

(56) References Cited

U.S. PATENT DOCUMENTS

2020/0125961 A1* 4/2020 Agrawal ................ G06N 5/003
2020/0279187 A1* 9/2020 Huang ................ G06F 11/3428

OTHER PUBLICATIONS

Maryam Parsa et al., "PABO:Pseudo Agent-Based Multi-Objective Bayesian Hyperparameter Optimization for Efficient Neural Accelerator Design", ARXIV.org, Cornell University Library, 201 Olin Library Cornell University, Ithaca, NY, 14853, dated Jun. 11, 2019, XP081378022, 8 pages.

Smithson Sean C. et al., "Neural networks designing neural networks: Multi-objective hyper-parameter optimization" 2016 IEEE/ACM International Conference on Computer-Aided Design (ICCAD), ACM, dated Nov. 7, 2016, pp. 1-8, XP033048930, 8 pages.

Diana Marculescu et al., "Hardware-Aware Machine Learning: Modeling and Optimization", ARXIV.org, Cornell University Library, 201 Olin Library Cornell University, Ithaca, NY, 14853, dated Sep. 14, 2018, XP080917440, 8 pages.

Yihui He et al., "AMC:AutoML for model compression and acceleration on mobile devices" arXiv:1802.03494v3 [cs.CV], dated Aug. 26, 2018, XP055651898, 17 pages.

* cited by examiner

| Architectural Hyper-Parameters | |
|---|---|
| Parameter name | Type |
| Number of hidden layers | Integer: [1,2,...] |
| Layer type | Categorical: {FC, CNN, Pooling} |
| Kernel size* | Integer: [1,2,...] |
| Activation function type* | Categorical: {ReLU, tanh} |
| ... | |

410

| Training Hyper-Parameters | |
|---|---|
| Parameter name | Type |
| Learning rate | Float: (0,1) |
| Optimizer type | Categorical: {Adagrid, SGD, RMSProp, Adam} |
| Dropout rate per layer* | Float: (0,1) |
| Batch size | Integer: [1,2,...] |
| ... | |

420

| Evaluation Hyper-Parameters | |
|---|---|
| Parameter name | Type |
| Evaluation metric | Categorical: {accuracy, cross_entropy} |
| Number of epochs | Integer: [1,2,...] |
| Test/Train data split ratio | Float: (0,0.5) |
| ... | |

RESOURCE-AWARE AUTOMATIC MACHINE LEARNING SYSTEM

RELATED APPLICATION

This application claims priority to U.S. Provisional Patent Application No. 62/913,554, filed on Oct. 10, 2019, which is incorporated by reference in its entirety.

TECHNICAL FIELD

This disclosure relates to machine learning and artificial intelligence (AI), and is particularly directed to a resource-aware automatic machine learning system.

BACKGROUND

Over the past decade, machine learning and AI have evolved at a very noticeable pace. The machine learning is dependent on building complex machine learning models. The machine learning models may include a plurality of hyper-parameters for the machine learning architectural, the machine learning training, and machine learning evaluation.

SUMMARY

The present disclosure describes a system for optimizing hyper-parameters for a machine-learning model under constraints. The system includes a memory storing instructions; and a processor in communication with the non-transitory memory. When the processor executes the instructions, the instructions are configured to cause the processor to obtain input data, the input data comprising a stopping criteria set, target data, and constraints; and obtain an initial hyper-parameter set and use the initial hyper-parameter set as a hyper-parameter set. For an iteration, when the processor executes the instructions, the instructions are configured to cause the processor to generate and store a machine learning model, the machine learning model generated based on the hyper-parameter set; evaluate an output from execution of the machine learning model to obtain a performance metrics set, the output evaluated based on the target data; and determine whether the performance metrics set satisfies the stopping criteria set. In response to determining that the performance metrics set satisfies the stopping criteria set: the instructions are configured to cause the processor to perform an exploitation process to obtain an optimal hyper-parameter set, and exit the iteration. In response to determining that the performance metrics set does not satisfy the stopping criteria set: the instructions are configured to cause the processor to perform an exploration process to obtain a next hyper-parameter set, and perform a next iteration with using the next hyper-parameter set as the hyper-parameter set. When the processor executes the instructions, the instructions are configured to cause the processor to generate and deploy an optimized machine learning model based on the optimal hyper-parameter set; and execute the machine learning model to dynamically generate and output predictions based on a varying input dataset.

The present disclosure also describes a method for optimizing hyper-parameters for a machine-learning model under constraints. The method includes obtaining, by a device, input data, the input data comprising a stopping criteria set, target data, and constraints. The device includes a memory storing instructions and a processor in communication with the memory. The method includes obtaining, by the device, an initial hyper-parameter set and use the initial hyper-parameter set as a hyper-parameter set. For an iteration, the method includes generating and storing, by the device, a machine learning model, the machine learning model generated based on the hyper-parameter set; evaluating, by the device, an output from execution of the machine learning model to obtain a performance metrics set, the output evaluated based on the target data; and determining, by the device, whether the performance metrics set satisfies the stopping criteria set. In response to determining that the performance metrics set satisfies the stopping criteria set, the method includes performing, by the device, an exploitation process to obtain an optimal hyper-parameter set, and exiting, by the device, the iteration. In response to determining that the performance metrics set does not satisfy the stopping criteria set, the method includes performing, by the device, an exploration process to obtain a next hyper-parameter set, and performing, by the device, a next iteration with using the next hyper-parameter set as the hyper-parameter set. The method further includes generating and deploying, by the device, an optimized machine learning model based on the optimal hyper-parameter set; and executing, by the device, the machine learning model to dynamically generate and output predictions based on a varying input dataset.

The present disclosure further describes a product for optimizing hyper-parameters for a machine-learning model under constraints. The product includes machine-readable media other than a transitory signal and instructions stored on the machine-readable media. When a processor executes the instructions, the processor is configured to obtain input data, the input data comprising a stopping criteria set, target data, and constraints; and obtain an initial hyper-parameter set and use the initial hyper-parameter set as a hyper-parameter set. For an iteration, when a processor executes the instructions, the processor is configured to generate and store a machine learning model, the machine learning model generated based on the hyper-parameter set; evaluate an output from execution of the machine learning model to obtain a performance metrics set, the output evaluated based on the target data; and determine whether the performance metrics set satisfies the stopping criteria set. In response to determining that the performance metrics set satisfies the stopping criteria set, the processor is configured to perform an exploitation process to obtain an optimal hyper-parameter set, and exit the iteration. In response to determining that the performance metrics set does not satisfy the stopping criteria set, the processor is configured to perform an exploration process to obtain a next hyper-parameter set, and perform a next iteration with using the next hyper-parameter set as the hyper-parameter set. When a processor executes the instructions, the processor is configured to generate and deploy an optimized machine learning model based on the optimal hyper-parameter set; and execute the machine learning model to dynamically generate and output predictions based on a varying input dataset.

BRIEF DESCRIPTION OF THE DRAWINGS

FIG. 4 shows various categories of hyper-parameters in machine learning models.

DETAILED DESCRIPTION

Figure 1:
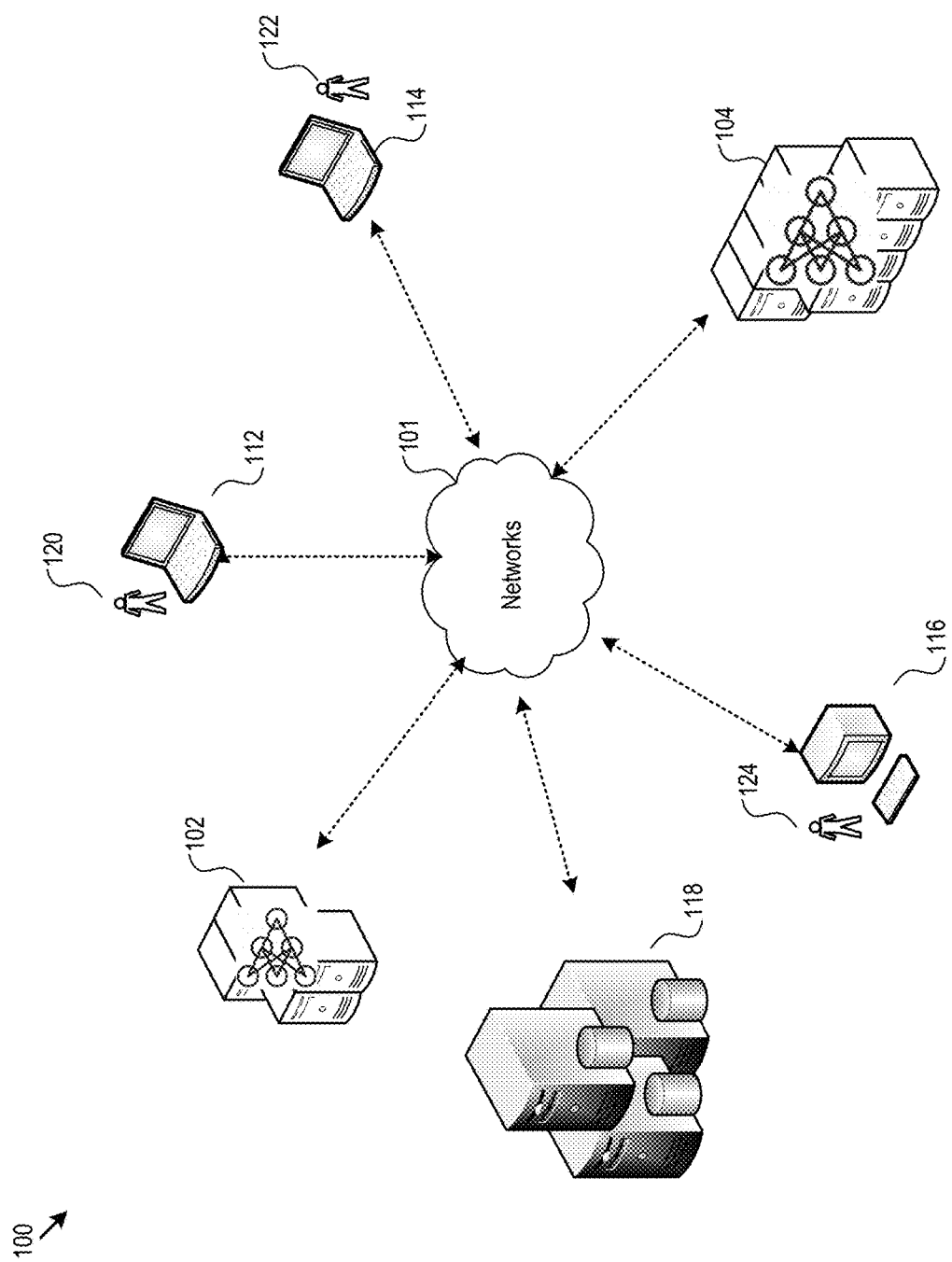
FIG. 1 shows an exemplary electronic communication environment for implementing a resource-aware machine learning system.

The disclosure will now be described in detail hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Artificial intelligence may be dependent on building complex machine learning models. For a machine learning problem, different machine learning models may include different hyper-parameter sets. A hyper-parameter is a parameter whose value is pre-determined before the learning/training process may begin. Given a hyper-parameter set for a particular machine learning model, the training algorithm may learn other parameters from the training data or target data. To build a more efficient machine model with high performance, the hyper-parameter set including one or more hyper-parameters may be optimized. The machine learning models may require different constraints, and the hyper-parameter may be optimized under the constraints.

The hyper-parameters of the machine learning model may be optimized to achieve better performance. The existing optimization method may have a low accuracy and undesired resource consumption. Additionally, constraints may influence the model building of the machine learning, leading to a more complex optimization problem.

The present disclosure describes a system, a method, and a product for optimizing a set of hyper-parameters according to certain constraints with a resource-aware automatic machine learning system, which may overcome some of the challenges and drawbacks discussed above.

The present disclosure describes a method and device for performing a resource-aware automatic machine learning to optimize hyper-parameters under constraints. The hyper-parameters may be optimized within a hyper-parameter space circumscribed by the constraints. A machine learning model may be generated based on the optimized hyper-parameter to be deployed. For a varying input dataset, the machine learning model based on the optimized hyper-parameters may be executed to generate and output one or more predictions according to the varying input dataset.

The present disclosure may be implemented with a hybrid methodology of an optimizer, such as a modified Bayesian optimizer and a genetic algorithm to efficiently find the optimal hyper-parameter set. In the present disclosure, the modified multi-objective Bayesian optimization with constraints may be used to optimizing samples of hyper-parameter sets, and Pareto-efficient candidate may be selected based on one or more objective.

The present disclosure is structured as following sections: an electronic environment and a computer system for implementing a resource-aware automatic machine learning, a framework architecture and embodiments of a resource-aware automatic machine learning.

Electronic environment and computer system for implementing a resource-aware automatic machine learning FIG. 1 shows an exemplary electronic communication environment 100 in which a resource-aware automatic machine learning system may be implemented. The electronic communication environment 100 may include one or more servers (102 and 104) including a resource-aware automatic machine learning, one or more user devices (112, 114, and 116) associated with users (120, 122, and 124), and one or more databases 118, in communication with each other via public or private communication networks 101.

The server 102 may be implemented as a central server or a plurality of servers distributed in the communication networks. While the server 102 shown in FIG. 1 is implemented as a single server, the server 102 may be implemented as a group of distributed servers, or may be distributed on the server 104.

The user devices 112, 114, and 116 may be any form of mobile or fixed electronic devices including but not limited to desktop personal computer, laptop computers, tablets, mobile phones, personal digital assistants, and the like. The user devices 112, 114, and 116 may be installed with a user interface for accessing the resource-aware automatic machine learning. The one or more database 118 of FIG. 1 may be hosted in a central database server, a plurality of distributed database servers, or in cloud-based database hosts. The database 118 may be organized and implemented in any form, including but not limited to relational database containing data tables, graphic database containing nodes and relationships, and the like. The database 118 may be configured to store the intermediate data and/or final results for implementing the resource-aware automatic machine learning.

Figure 2:
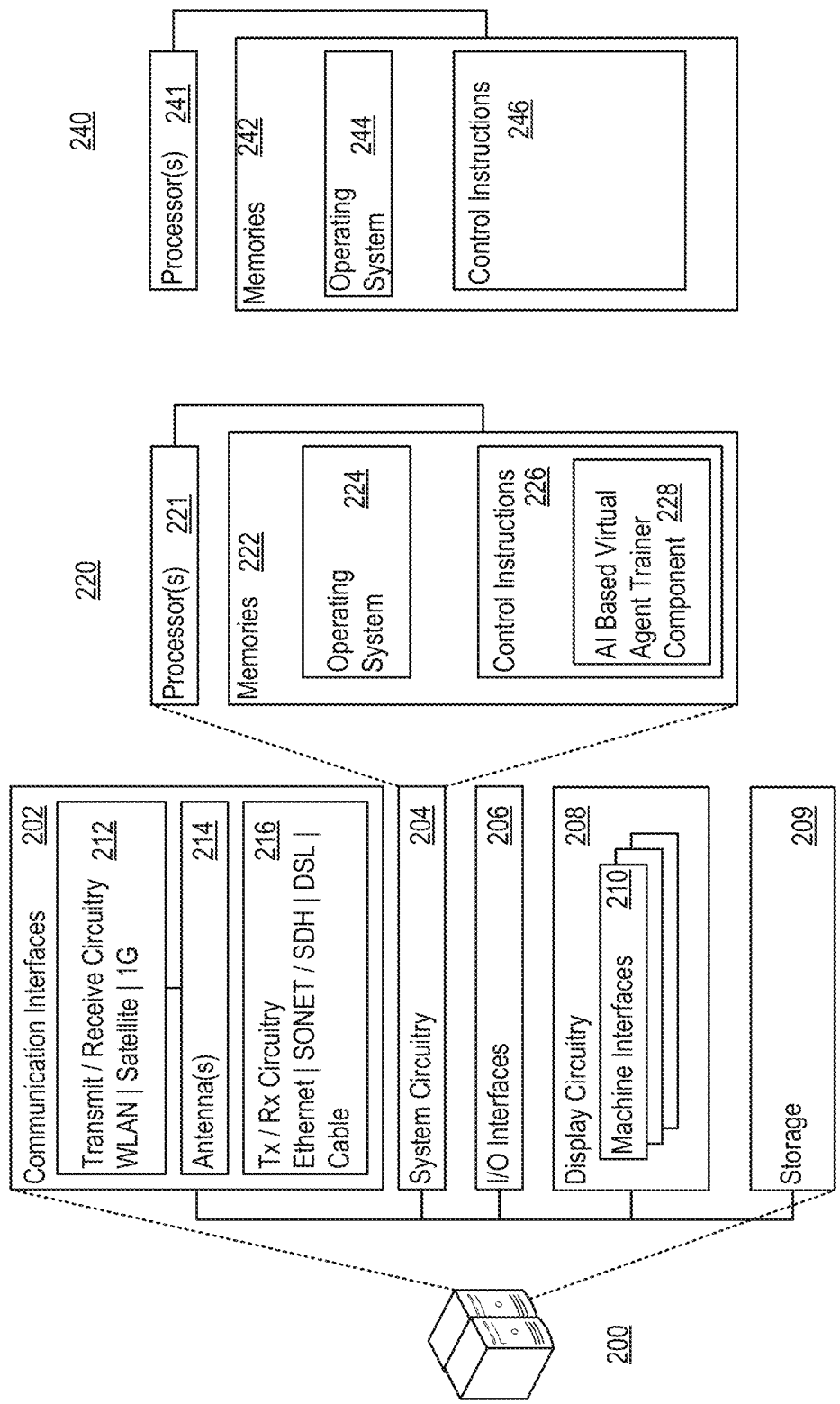
FIG. 2 shows computer systems that may be used to implement various components of the electronic communication environment of FIG. 1.

FIG. 2 shows an exemplary system, which is a computer system 200 for implementing the server 102 including a resource-aware automatic machine learning, or the user devices 112, 114, and 116. The computer system 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 209 may be used to store various initial, intermediate, or final data or model for implementing the resource-aware automatic machine learning. These data corpus may alternatively be stored in the database 118 of FIG. 1. In one implementation, the storage 209 of the computer system 200 may be integral with the database 118 of FIG. 1. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry.

For example, at least some of the system circuitry 204 may be implemented as processing circuitry 220 for the server 102 including a resource-aware automatic machine learning of FIG. 1. The processing circuitry 220 of the resource-aware automatic machine learning may include one or more processors 221 and memories 222. The memories 222 stores, for example, control instructions 226 and an operating system 224. The control instructions 226, for example may include instructions for implementing the components 228 of a resource-aware automatic machine learning. In one implementation, the instruction processors 221 execute the control instructions 226 and the operating system 224 to carry out any desired functionality related to the resource-aware automatic machine learning.

Alternatively, or in addition, at least some of the system circuitry 204 may be implemented as client circuitry 240 for the user devices 112, 114, and 116 of FIG. 1. The client circuitry 240 of the user devices may include one or more instruction processors 241 and memories 242. The memories 242 stores, for example, control instructions 246 and an operating system 244. In one implementation, the instruction processors 241 execute the control instructions 246 and the operating system 244 to carry out any desired functionality related to the user devices.

Framework and embodiments for resource-aware automatic machine learning

Artificial intelligence may be dependent on building complex machine learning models. The machine learning models may include several sets of layers.

Figure 3:
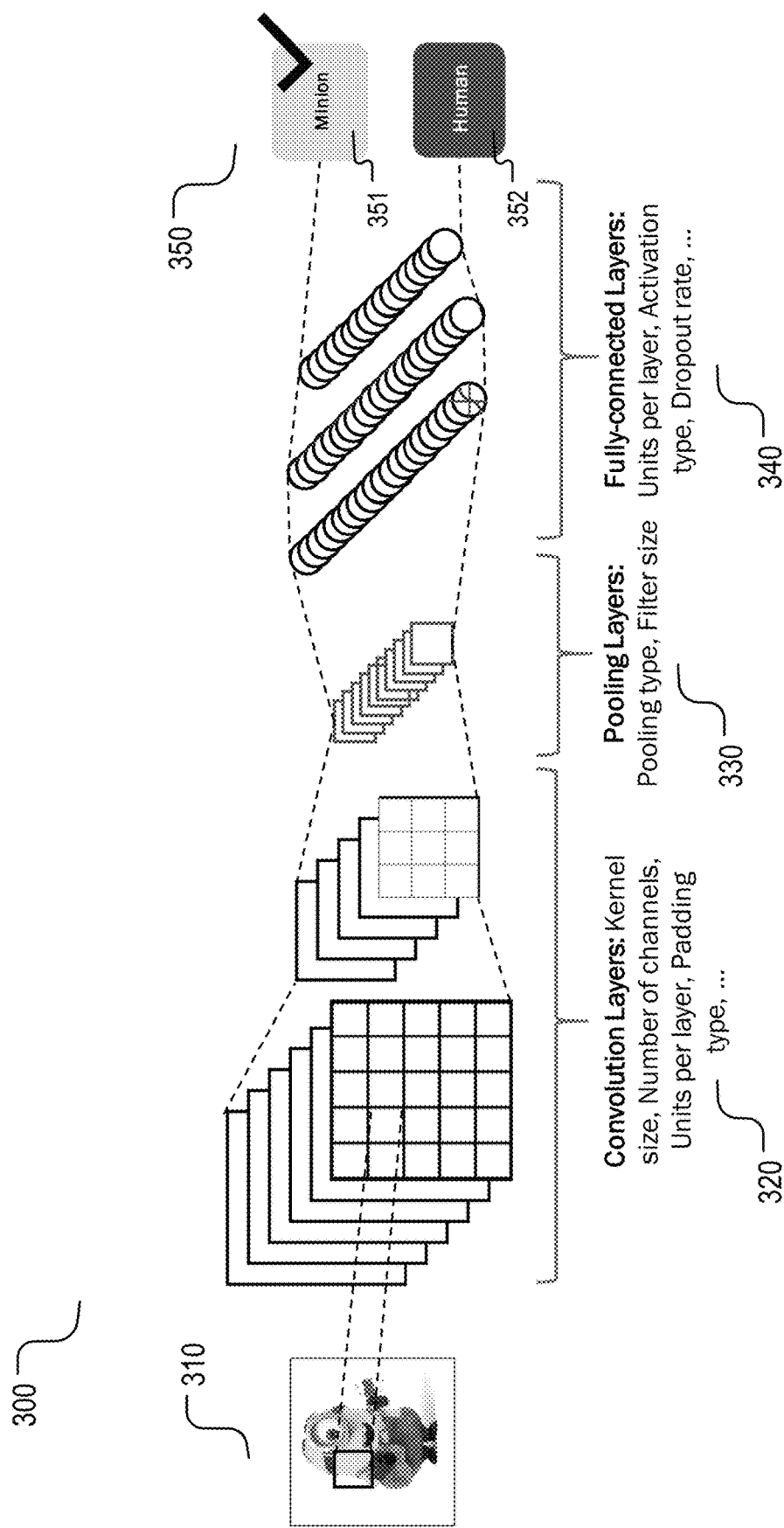
FIG. 3 shows an architecture of a machine learning model.

FIG. 3 shows an example of a machine learning model 300 to classify humans from minions. The machine learning model 300 may include a set of convolution layers 320, a set of pooling layers 330, and a set of fully-connected layers 340. The machine learning model 300 may receive input data 310, and output a result 350. The input data 310 may be training data with known result or may be to-be-classified data.

Each set of layers in a machine learning model may include one or more hyper-parameters. For example, the set of convolution layers 320 may include hyper-parameters about kernel size, number of channels, units per layer, padding type, etc. The set of pooling layers 330 may include hyper-parameters for pooling type, filter size, etc. The set of fully-connected layers 340 may include hyper-parameters for units per layer, activation type, dropout rate, etc. The result 350 may include a plurality of classes, for example, two classes as shown in FIG. 3, or more than two classes.

For example, in one implementation, a first class 351 may include "minion", and a second class 352 may include "human". The machine learning model 300 may, for an input image, classify an object in the input image as including either the first class "minion" or the second class "human".

Referring to FIG. 4, hyper-parameters of a machine learning model may include hyper-parameters for an architectural structure 410 of the machine learning model, hyper-parameters for a training stage 420 of the machine learning model, and/or hyper-parameters for an evaluation stage 430 of the machine learning model.

To optimize the hyper-parameters of a machine learning model, some constraints may need to consider. The constraints may limit the searchable hyper-parameters space, and model candidates may be samples from this allowable search space. For example, one of the constraints may be that the trained machine learning model may use less than 100 MB of memory space, and/or another of the constraints may be that an inference may not use more than 10 G-flops on a standard central processing unit (CPU). Translation of these constraints into the restriction of hyper-parameter space may be challenges for conventional methods. The present disclosure describes a method for resource-aware automatic machine learning, which may solve at least a portion of the above problems and challenges.

Figure 5:
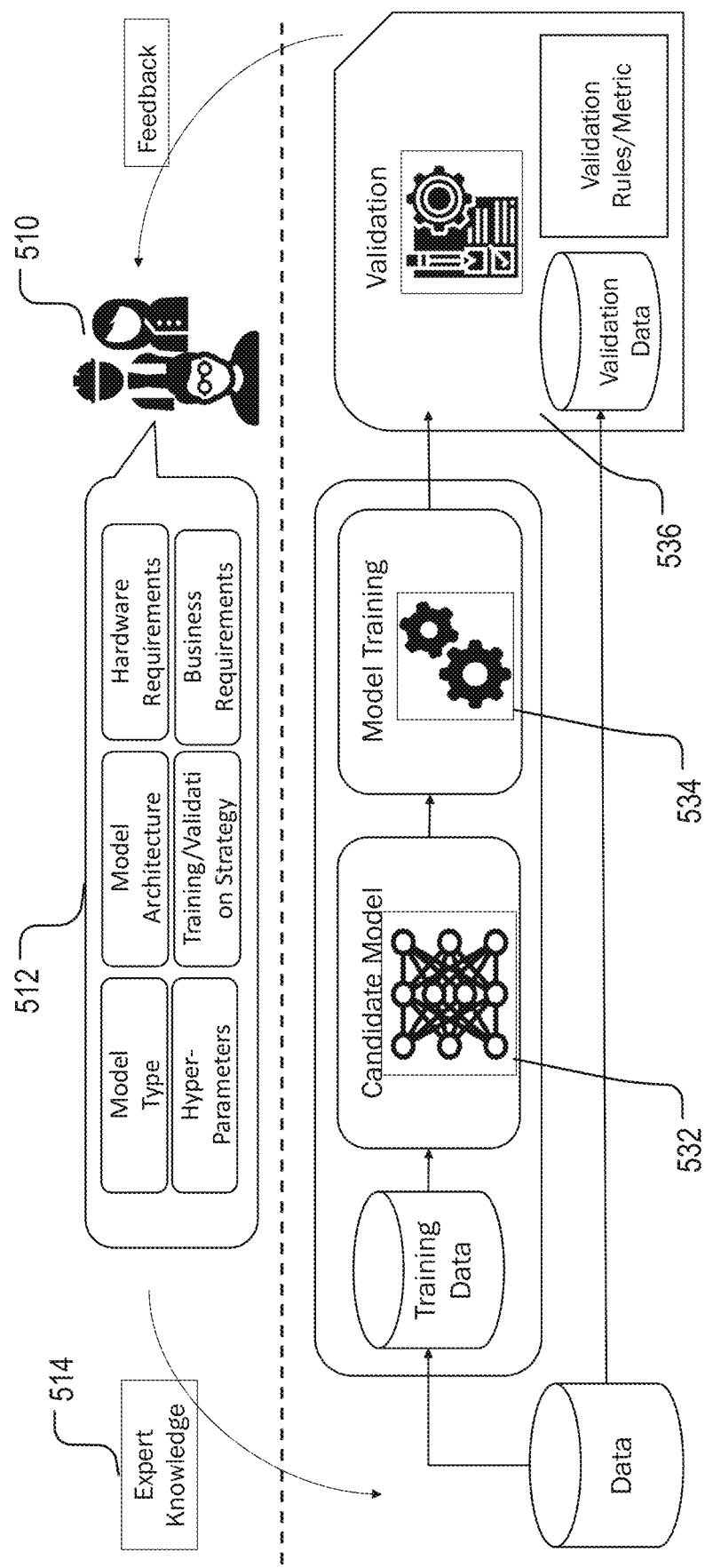
FIG. 5 shows exemplary inputs and involvement of human experts in building machine learning models.

A traditional or conventional process to determine or optimize the hyper-parameters of the machine learning model may requires inputs from experts, which may be time consuming and expensive. Referring to FIG. 5, some methods of building a machine learning model may need inputs from human experts 510. The human experts 510 may provide expert knowledge 514 in one or more of the following areas 512: model type, model architecture, hardware requirements, hyper-parameters, training/validation strategy, and business requirements. The expert knowledge 514 may need to optimize the hyper-parameters in the candidate model 532, model training 534, and/or model validation 536.

Figure 6:
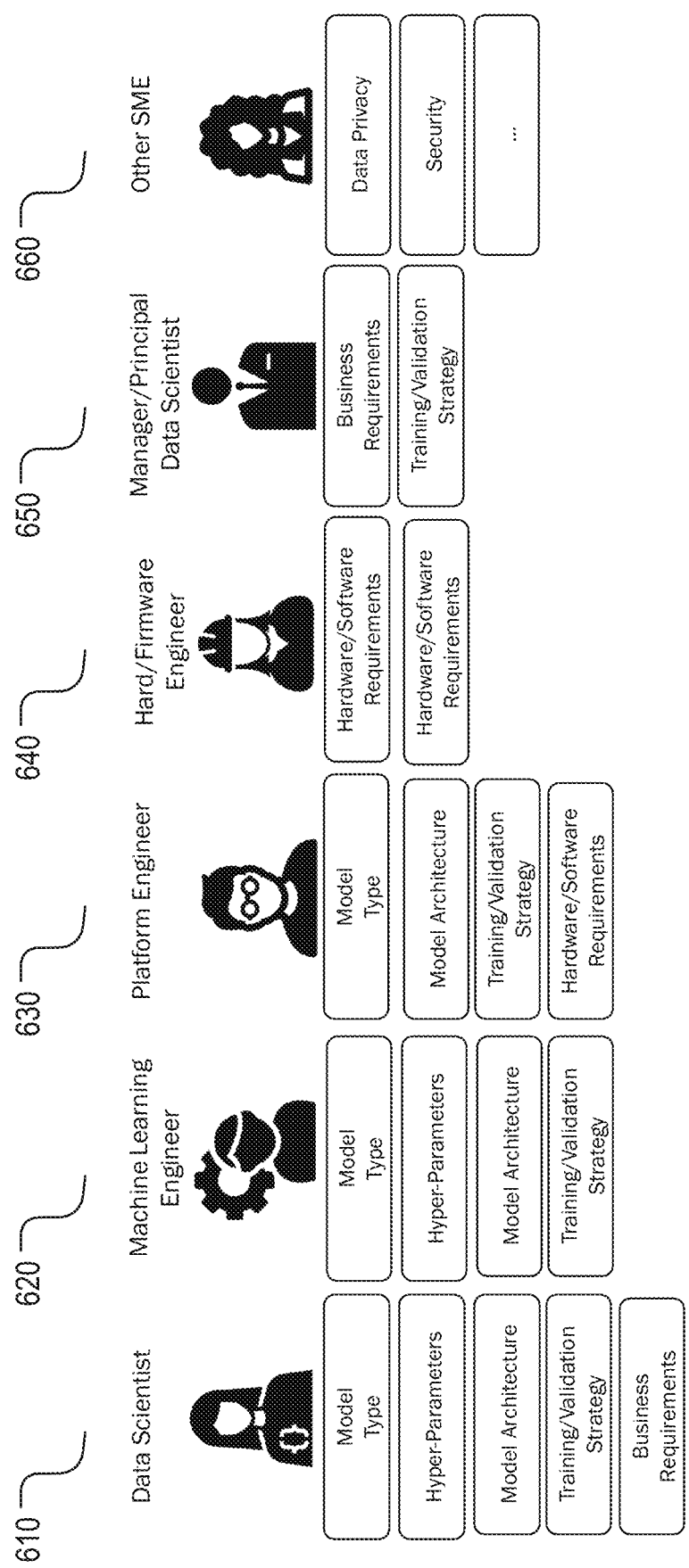
FIG. 6 shows a diverse human skillset in building machine learning models.

Referring to FIG. 6, some methods of building a machine learning model may need inputs of human experts from a diverse human skillset, which may include data scientists 610, machine learning engineers 620, platform engineers 630, hard/firmware engineers 640, manager/principal data scientists 650, and/or other subject matter experts (SMEs) 660. A method with end-to-end pipeline to build machine learning models may have experts (e.g., scientists or engineers) make choices mainly based on their intuition and existing architectures. This method may associate too many options and may have high expenses (in term of time, expertise, experiences, and/or computational power).

The present disclosure describes a resource-aware automatic machine learning method for the system to optimize the hyper-parameters, which may resolve some problems. The present disclosure may handle constraints in original processes.

Figure 7:
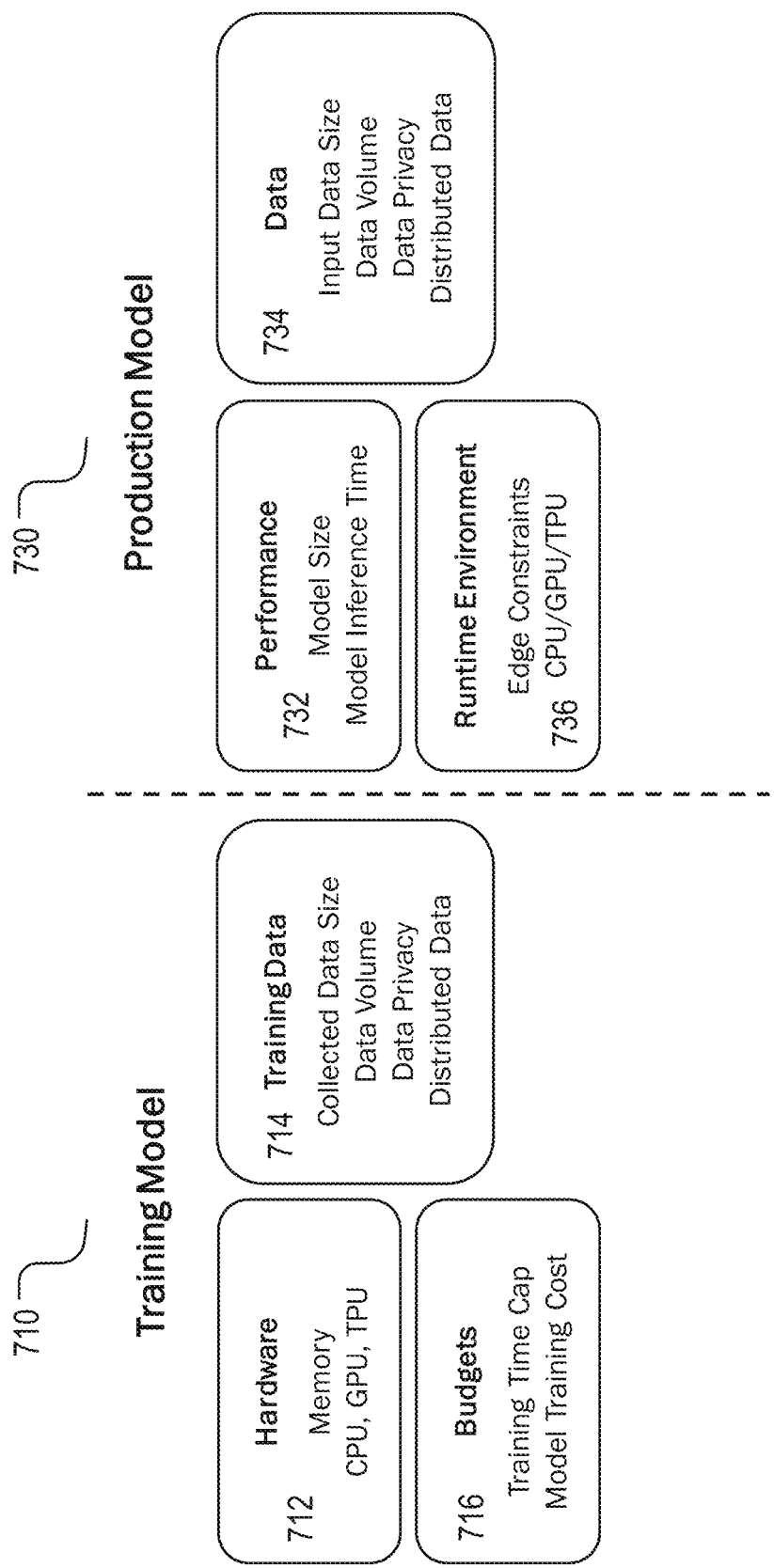
FIG. 7 shows exemplary resource constraints in training models and production models.

Referring to FIG. 7, there may be one or more constraints in a training model 710 and/or a production model 730. The one or more constraints may influence the model-building optimization. For example, in one implementation, constraints in training model 710 may include hardware constraints 712, for example but not limited to, a memory size and a CPU computing power. In another implementation, constraints in training model 710 may include soft constraints, such as training data 714 and/or budgets 716.

In another implementation, constraints in production model 730 may include performance constraints 732, data constraints 734, and/or runtime environment constraints 736.

Figure 8:
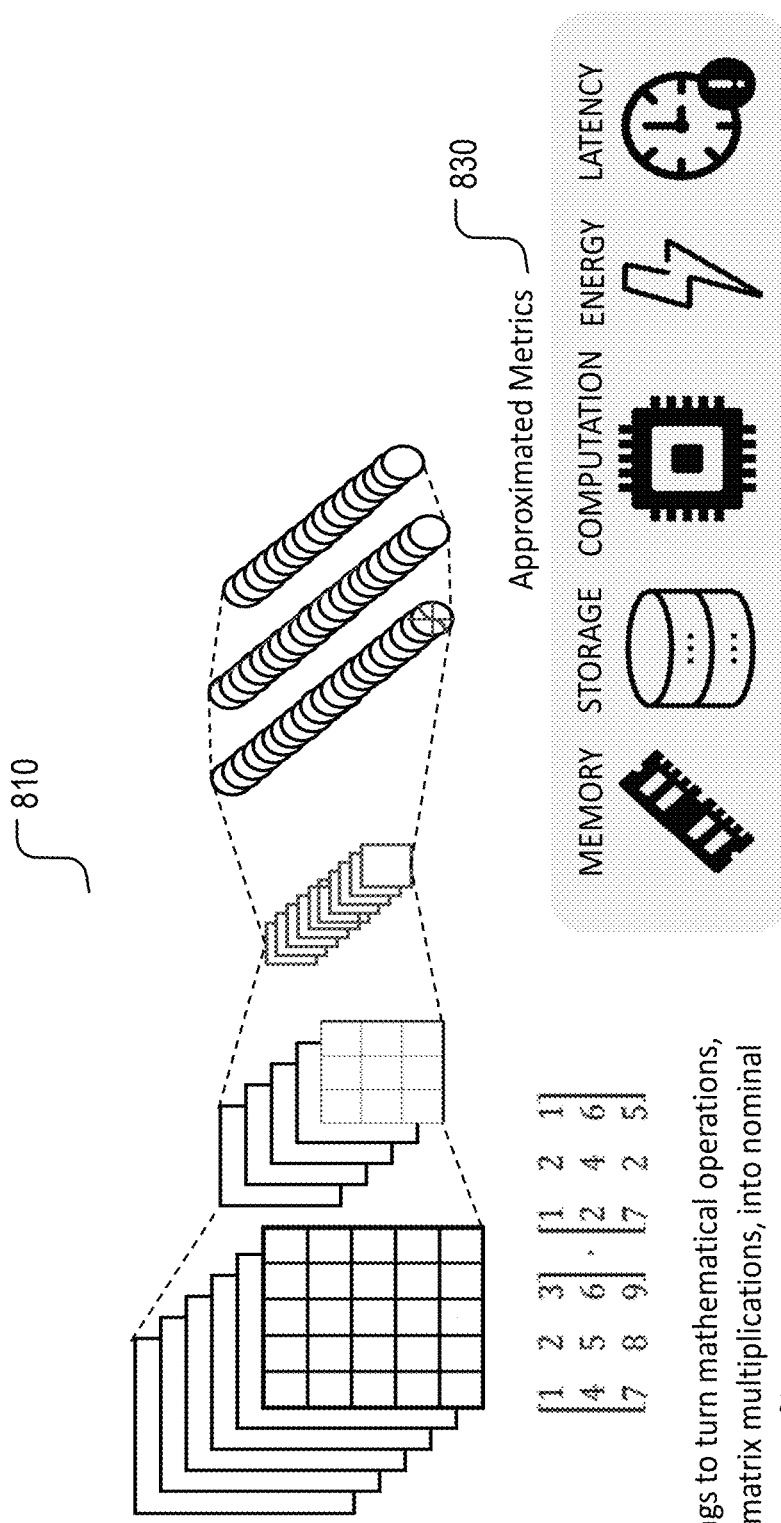
FIG. 8 shows an exemplary embodiment of model-based approach to measure resource consumption.

Constraints may be predicted by various methods. In one implementation, referring to FIG. 8, the constraint prediction may be model-based. The constraints may be predicted based on a model architecture 810, and/or operations performed by each cell in each layer. The constraint prediction model may use proxy functions to estimate resources used. Efficient calculation of constraints may be performed without prior experience on system. The constraint prediction may be typically based on known equations based on computer and model architecture. The constraint prediction may be less accurate since it is insensitive to the real operations of platform. The used resources may be quantified by one or more approximated metrics 830, including but not limited to, a memory, a storage, a computation, an energy, and a latency.

Figure 9:
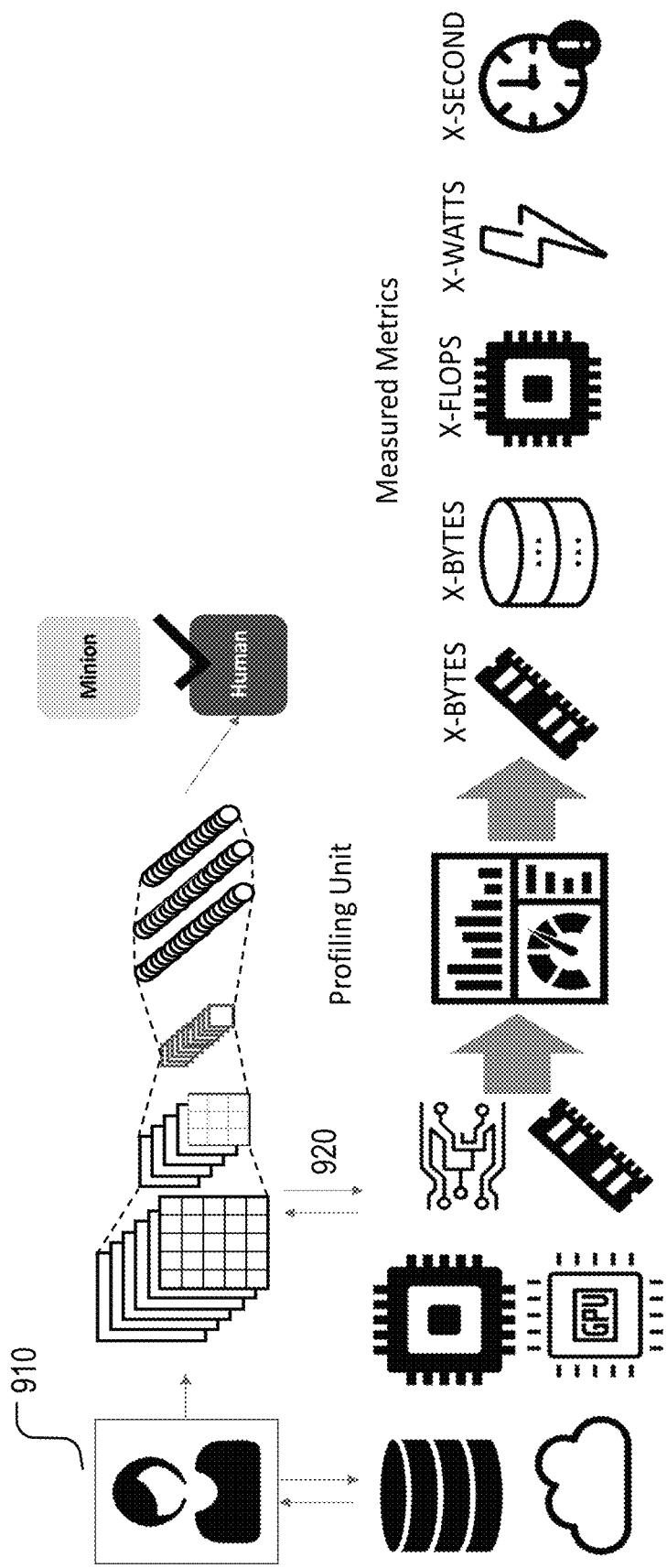
FIG. 9 shows an exemplary embodiment of profiling/performance-based approach to measure resource consumption.

In another implementation, referring to FIG. 9, the constraint prediction may be platform-based. For example, the constraint prediction may use accurate hardware profiling tools and may directly measure resource consumption of model architectures through experimentation 920. For another example, the constraint prediction may predict constraints based on inferences from empirical observations. The platform-based constraint prediction may have high accuracy and may be adaptive. The platform-based constraint prediction may use another model for one constraint to predict the constraint value for target model. The platform-based constraint prediction may need extensive experience on platform to train prediction model. The platform-based constraint prediction may need specialized profiling tools and SME 910 for accurate modeling of constraints.

The present disclosure describes an automatic machine learning method to optimizing hyper-parameters based on constraints, so that the automatic machine learning method may be resource-aware.

Figure 10:
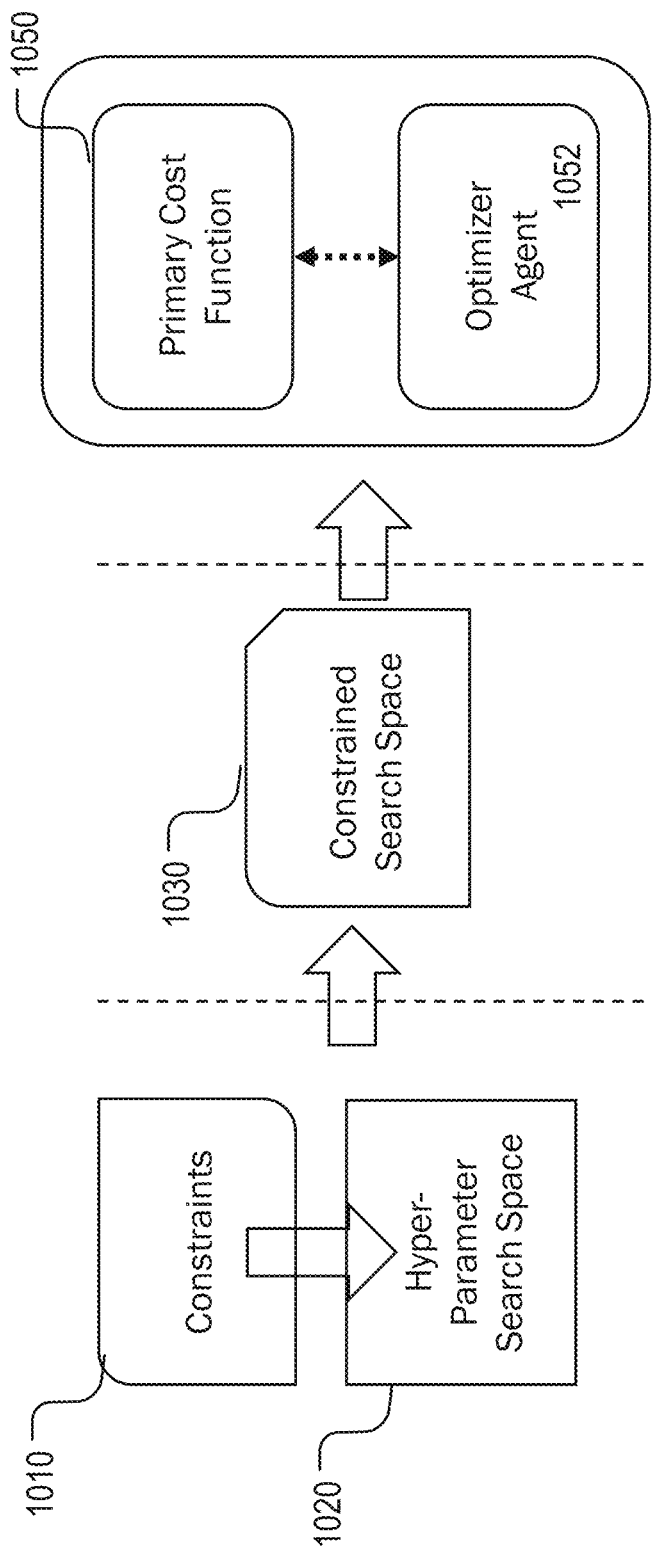
FIG. 10 shows an embodiment of introducing resource constraints into automatic machine learning.

Referring to FIG. 10, in one implementation, constraints 1010 may be introduced into an automatic machine learning algorithm by imposing constraints 1010 on the hyper-parameter search space 1020 to obtain a constrained hyper-parameter search space 1030 and keeping the primary cost function 1050 the same. For example, Bayesian optimization with constraint-aware acquisition function may use this implementation to introduce constraints. In another implementation, the primary cost function 1050 may interact with an optimizer agent 1052.

Figure 11:
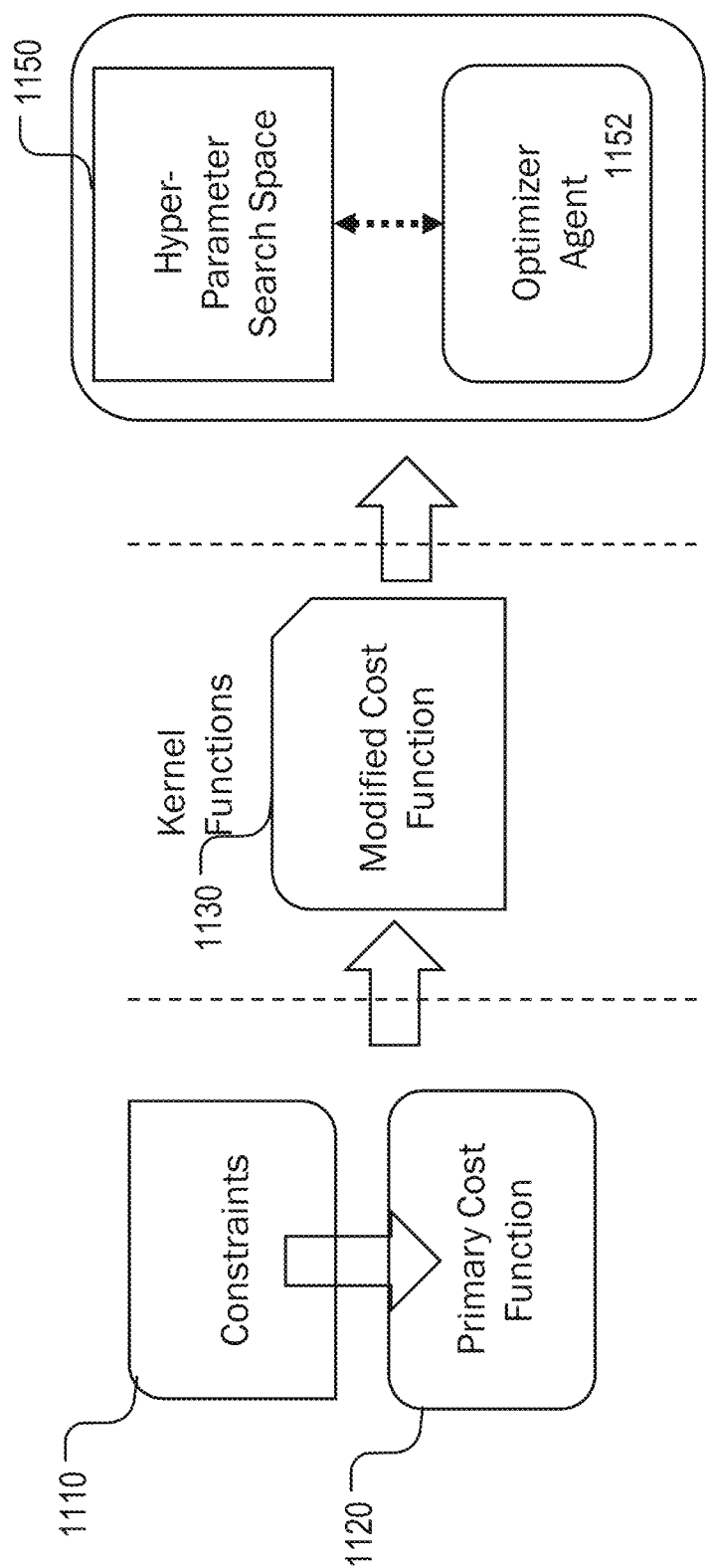
FIG. 11 shows another embodiment of introducing resource constraints into automatic machine learning.

Referring to FIG. 11, in another implementation, constraints 1110 may be introduced into an automatic machine learning algorithm by applying kernel functions to primary cost function 1120 to obtain modified cost function 1130, and deriving an unifying cost function based on constraints to optimize hyper-parameters in the hyper parameter search space 1150 according to interactions with an optimizer agent 1152. For example, inverse efficiency score (IES) may use this implementation to maximize accuracy and minimize memory requirement.

Figure 12:
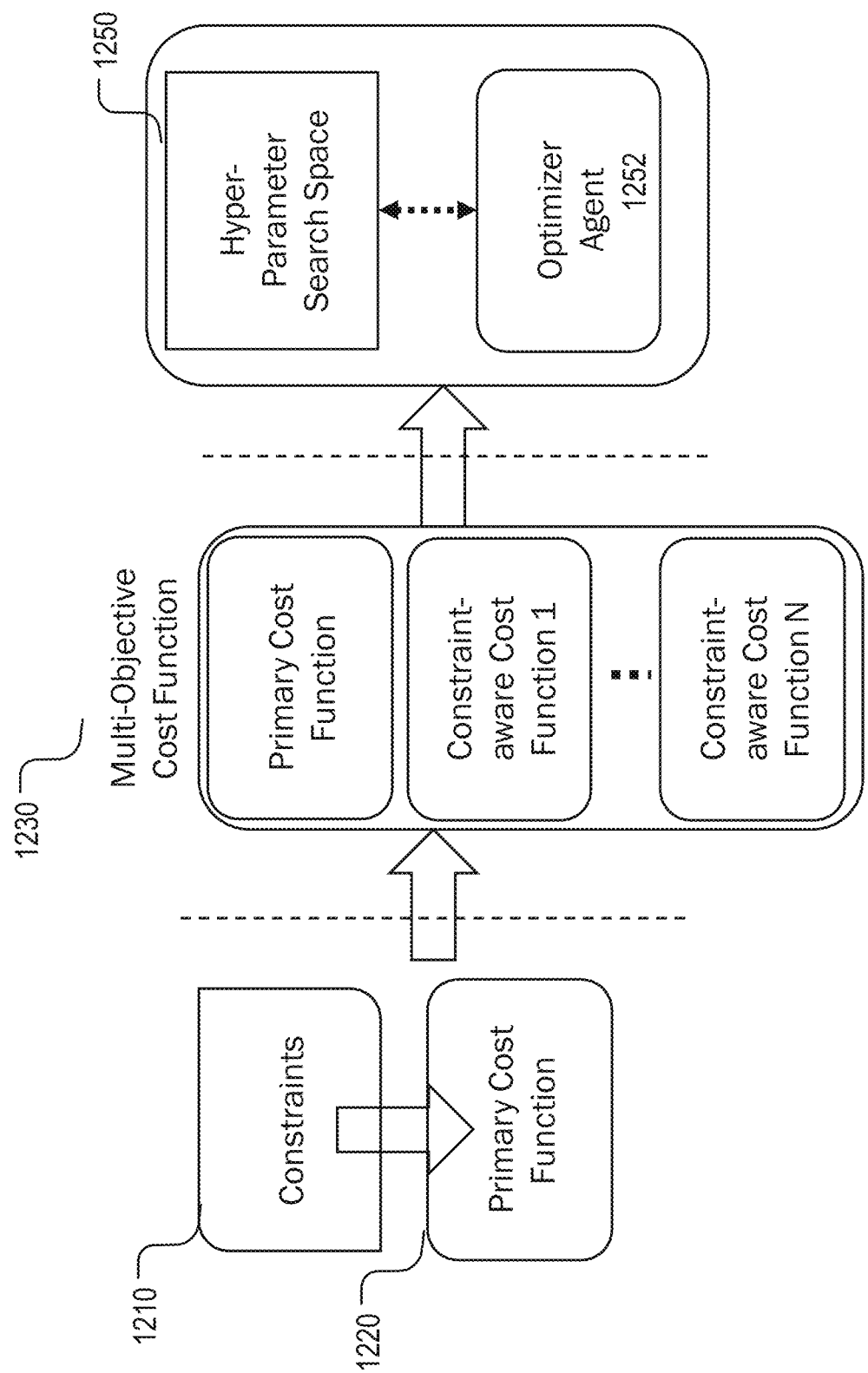
FIG. 12 shows another embodiment of introducing resource constraints into automatic machine learning.

Referring to FIG. 12, in another implementation, constraints 1210 may be introduced into an automatic machine learning algorithm including a primary cost function 1220 by representing constraints via one or more multi-objective cost functions 1230, optimizing the objective functions alongside the primary cost functions 1220 to obtain hyper-parameters in the hyper parameter search space 1250 interacting with an optimizer agent 1252. Optionally, a human SME or other algorithm may select a best solution from a Pareto front solution. For example, Pareto front optimization with genetic algorithm use this implementation to introduce constraints.

Figure 13:
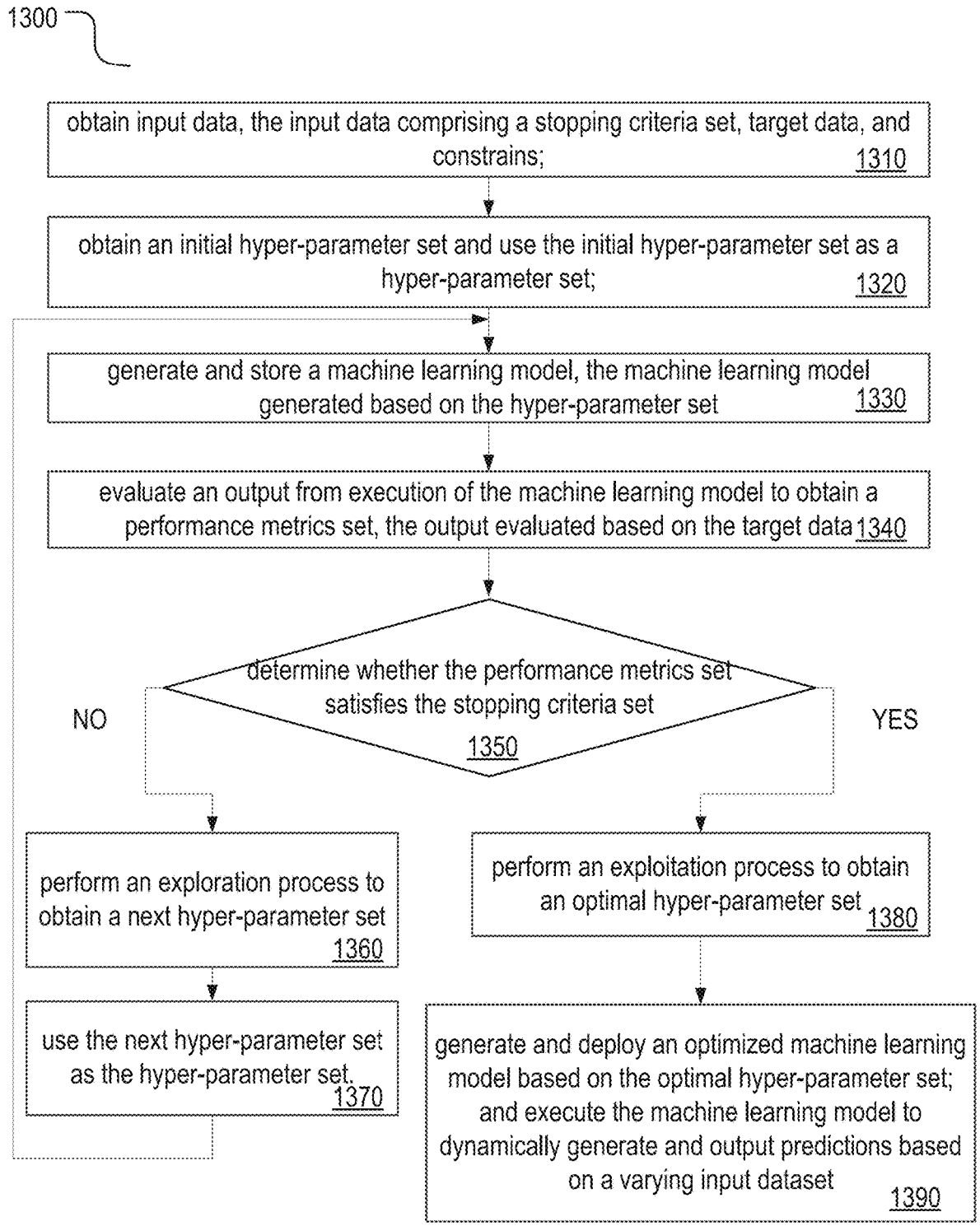
FIG. 13 shows a flow diagram of a method for resource-aware automatic machine learning.

The present disclosure describes a method for resource-aware automatic machine learning for optimizing hyper-parameters for a machine-learning model under constraints. Referring to FIG. 13, the method 1300 may include a part or all of the following steps.

Figure 14:
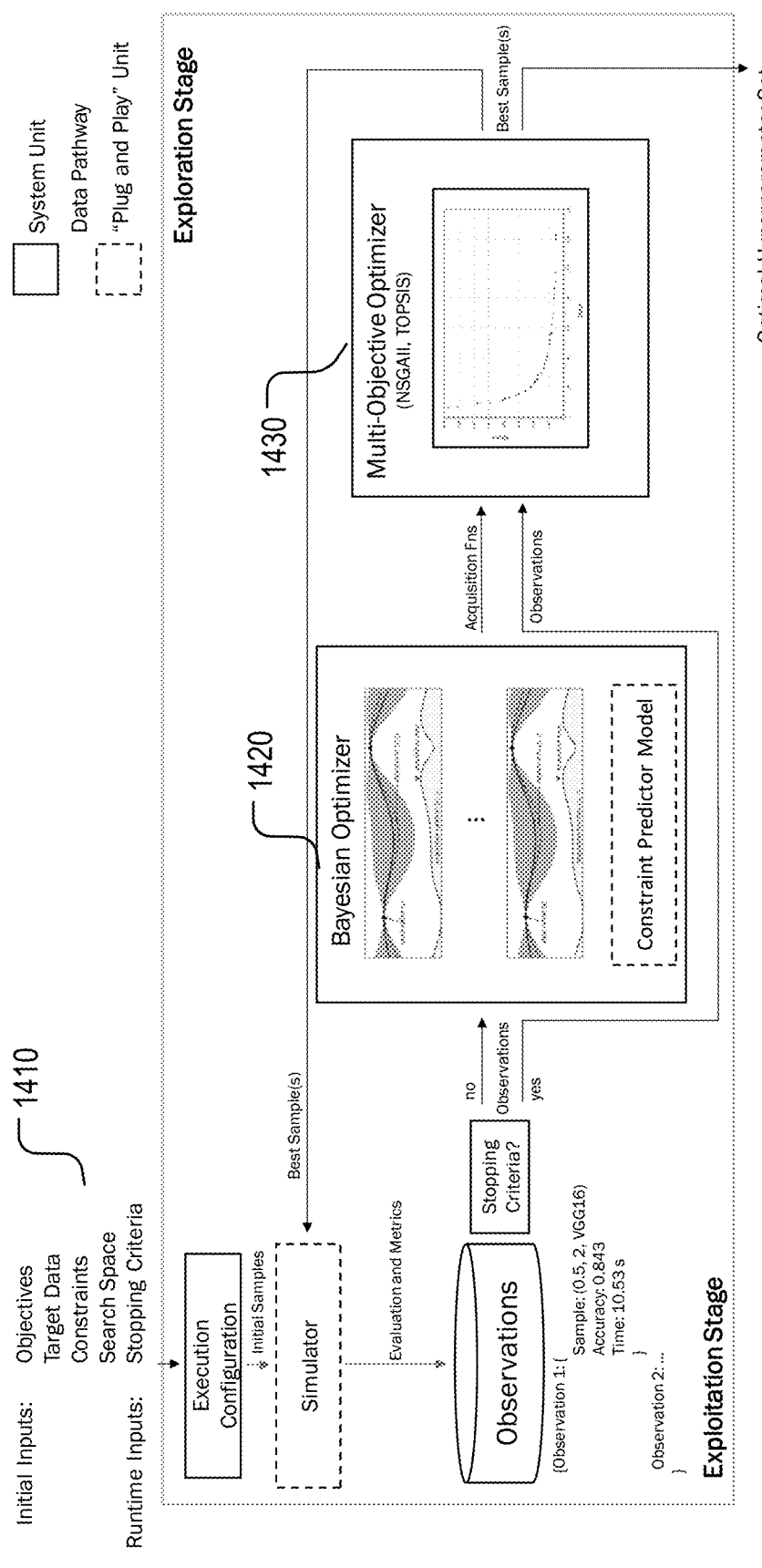
FIG. 14 shows an embodiment of a method for resource-aware automatic machine learning.

Step 1310: obtain input data, the input data comprising a stopping criteria set, target data, and constraints. Referring to FIG. 14, input data 1410 may include initial input data and/or runtime input data. The initial input data may include objectives, target data, constraints, and/or search space. The runtime input data may include stopping criteria.

Step 1320: obtain an initial hyper-parameter set and use the initial hyper-parameter set as a hyper-parameter set. The initial hyper-parameter set may determine a particular machine learning model. The training algorithm may learn other parameters of the machine learning model based on the training data or target data. To build a more efficient machine model with high performance, the hyper-parameter set including one or more hyper-parameters may be optimized. For example, a hyper-parameter set may include one or more hyper-parameters characterizing a type and/or number of convolution layers, a type and/or number of pooling layers, or a type and/or number of fully-connected layers.

In one implementation, initialize starting data point may include the initial hyper-parameter set. In another implementation, the initial hyper-parameter set may be randomly selected by a system as an initial sample.

Step 1330: generate and store a machine learning model, the machine learning model generated based on the hyper-parameter set. The method may build a machine learning model based on the hyper-parameter set, and store the machine learning model in a memory or a storage. Depending on the one or more hyper-parameters in the hyper-parameter set, the system may build or construct the machine learning model.

Step 1340: evaluate an output from execution of the machine learning model to obtain a performance metrics set, the output evaluated based on the target data. The method may include evaluating the machine learning model based on the target data to obtain a performance metrics set. The method may include inputting the target data to the constructed machine learning model, and training the machine learning model based on the target data, and obtaining the performance metrics set. The performance metrics set may be correspond to the present hyper-parameter set used to construct the present machine learning model. In one implementation, the performance metrics set may include sample characteristics, accuracy, and time.

Step 1350: determine whether the performance metrics set satisfies the stopping criteria set. The stopping criteria set may be obtained in step 1310, and may include a range or a threshold for one or more parameter in the performance metrics set. In one implementation, the stopping criteria set may include a range or a threshold for each parameter in the performance metrics set. For example, the stopping criteria may include a low threshold for the accuracy as 0.85, and/or the stopping criteria may include a high threshold for the running time as 15 seconds.

In response to determining that the performance metrics set satisfies the stopping criteria set, step 1380: perform an exploitation process to obtain an optimal hyper-parameter set. In one implementation, step 1380 may include obtaining a Pareto front based on a multi-objective optimization model, the multi-objective optimization model comprising a non-dominated sorting genetic algorithm II (NSGAII) model; and selecting the optimal hyper-parameter set based on a technique for order of preference by similarity to ideal solution (TOPSIS) model and the Pareto front.

In response to determining that the performance metrics set does not satisfy the stopping criteria set, step 1360: perform an exploration process to obtain a next hyper-parameter set; and step 1370: use the next hyper-parameter set as the hyper-parameter set and then begin step 1330 as a next iteration. The method 1300 may include step 1390: generate and deploy an optimized machine learning model based on the optimal hyper-parameter set; and/or execute the machine learning model to dynamically generate and output predictions based on a varying input dataset.

In one implementation, steps 1360 and 1370 may include obtaining an acquisition function based on a Bayesian optimization model and a constraint prediction model; obtaining a Pareto front based on a multi-objective optimization model and the acquisition function, wherein the multi-objective optimization model includes a NSGAII model; and selecting the next hyper-parameter set based on a TOPSIS model and the Pareto front.

Referring to FIG. 14, the present disclosure describes another embodiment of a system 1400 performing a multi-objective method, such as a multi-objective Bayesian optimization genetic algorithm (MOBOGA) architecture. The system 1400 may include a Bayesian optimizer 1420 and a multi-objective optimizer 1430. The system may obtain Input data 1410. The input data 1410 may include initial input data and/or runtime input data. The initial input data may include objectives, target data, constraints, and/or search space. The runtime input data may include stopping criteria.

Figure 15:
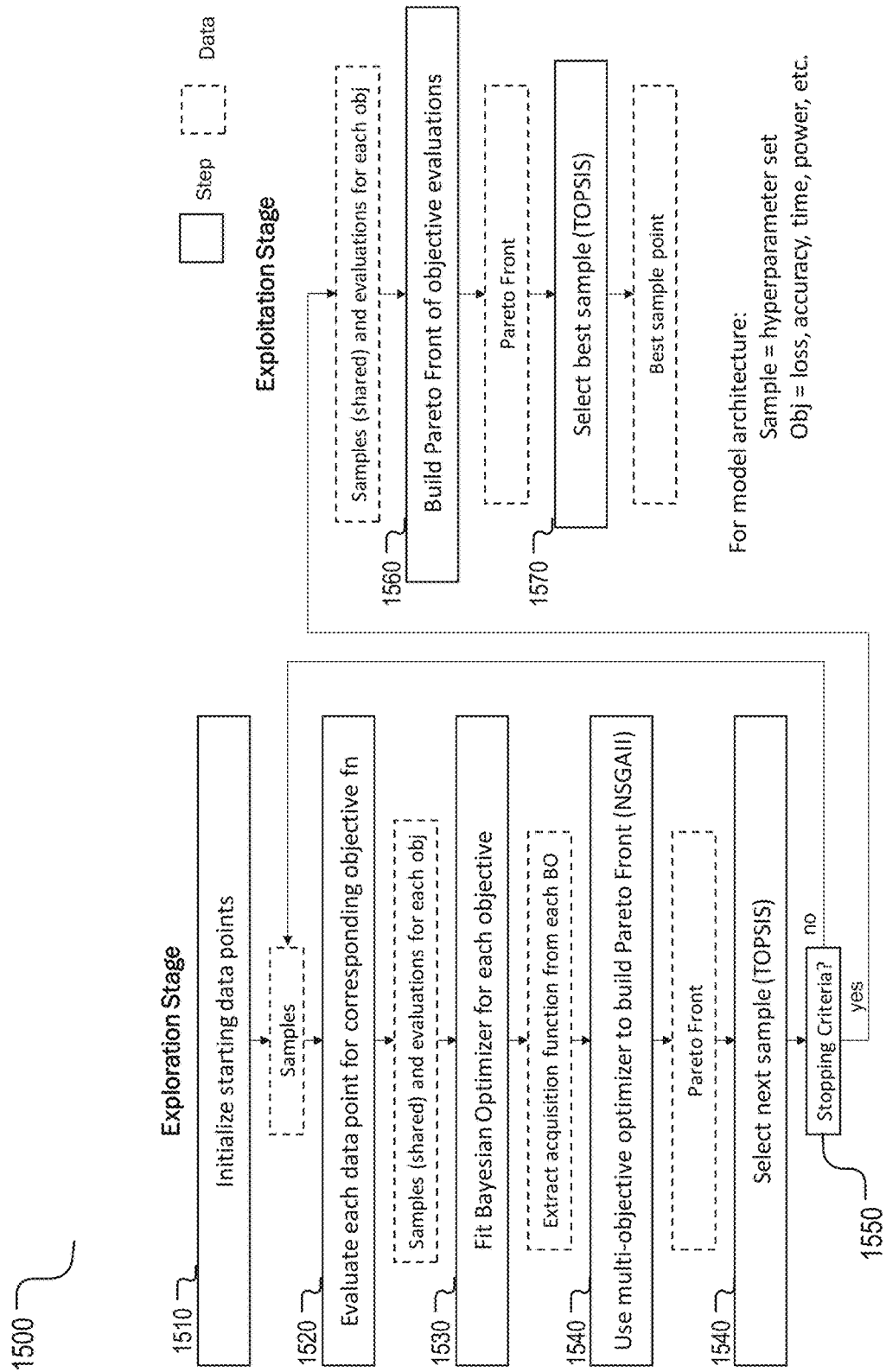
FIG. 15 shows another flow diagram of a method for resource-aware automatic machine learning.

Referring to FIG. 15, the present disclosure describes another embodiment of a multi-objective method, such as a MOBOGA method 1500. The method 1500 may include a part or all of the follow steps: step 1510: initialize starting data points to obtain samples, wherein samples may refer to samples of hype-parameter sets; step 1520: evaluate each data point for corresponding objective function; step 1530: fit Bayesian optimizer for each objective; step 1540: use multi-objective optimizer to build Pareto Front; step 1540: select next sample; step 1550, determine whether stopping criteria are satisfied; if no, use the next samples to perform a next iteration in step 1520; if yes, go to step 1560: build Pareto front of objective evaluations and step 1570: select best samples.

In one implementation, the Bayesian optimization may be applicable when gradient is unknown or function is non-convex. The Bayesian optimization may fit Gaussian Process (GP) to observations. The Bayesian optimization may define an acquisition function. The Bayesian optimization may query the acquisition function at the maximum.

In another implementation, Bayesian optimization may be used to efficiently estimate an unknown function.

Figure 16:
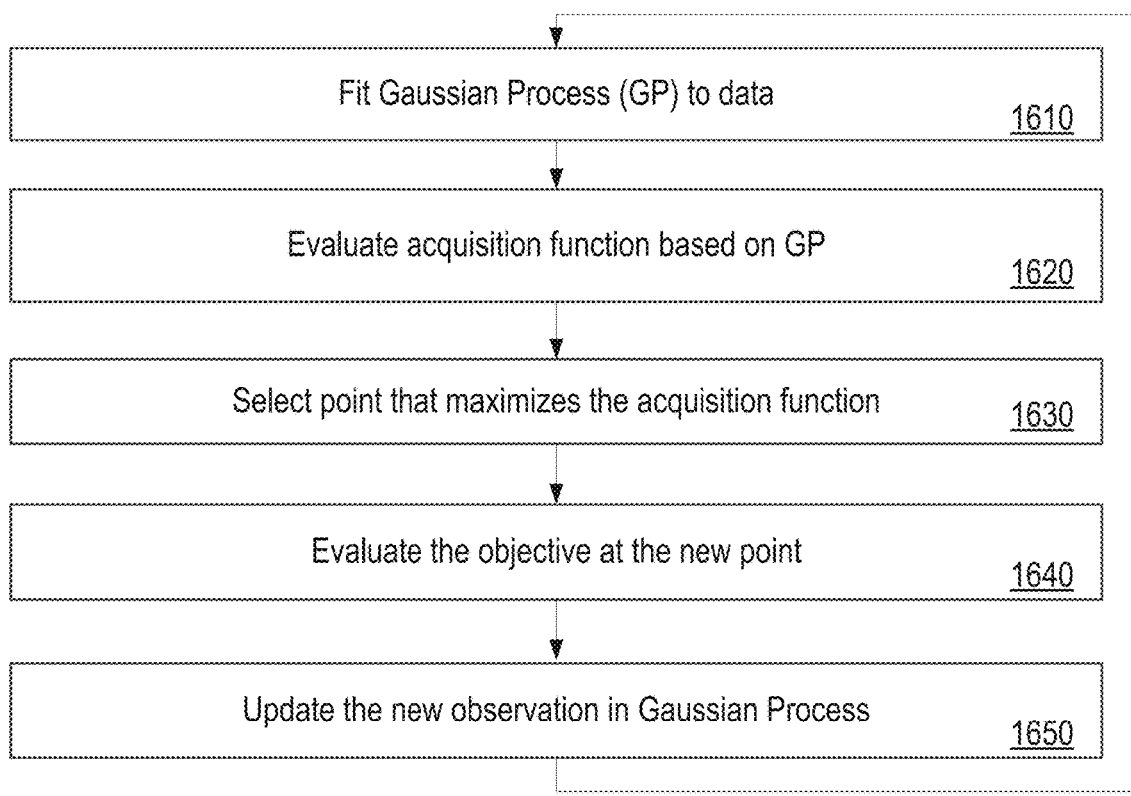
FIG. 16 shows a flow diagram of a method for Bayesian optimization.

Referring to FIG. 16, an optimization method, such as a Bayesian optimization method 1600 may include a part or all of the following steps: step 1610: fit Gaussian Process (GP) to data; step 1620: evaluate acquisition function based on GP; step 1630: select point that maximizes the acquisition function; step 1640: evaluate the objective at the new point, wherein the new point may refer to a hyper-parameter set; step 1650: update the new observation in Gaussian Process and then repeat step 1610.

Figure 17:
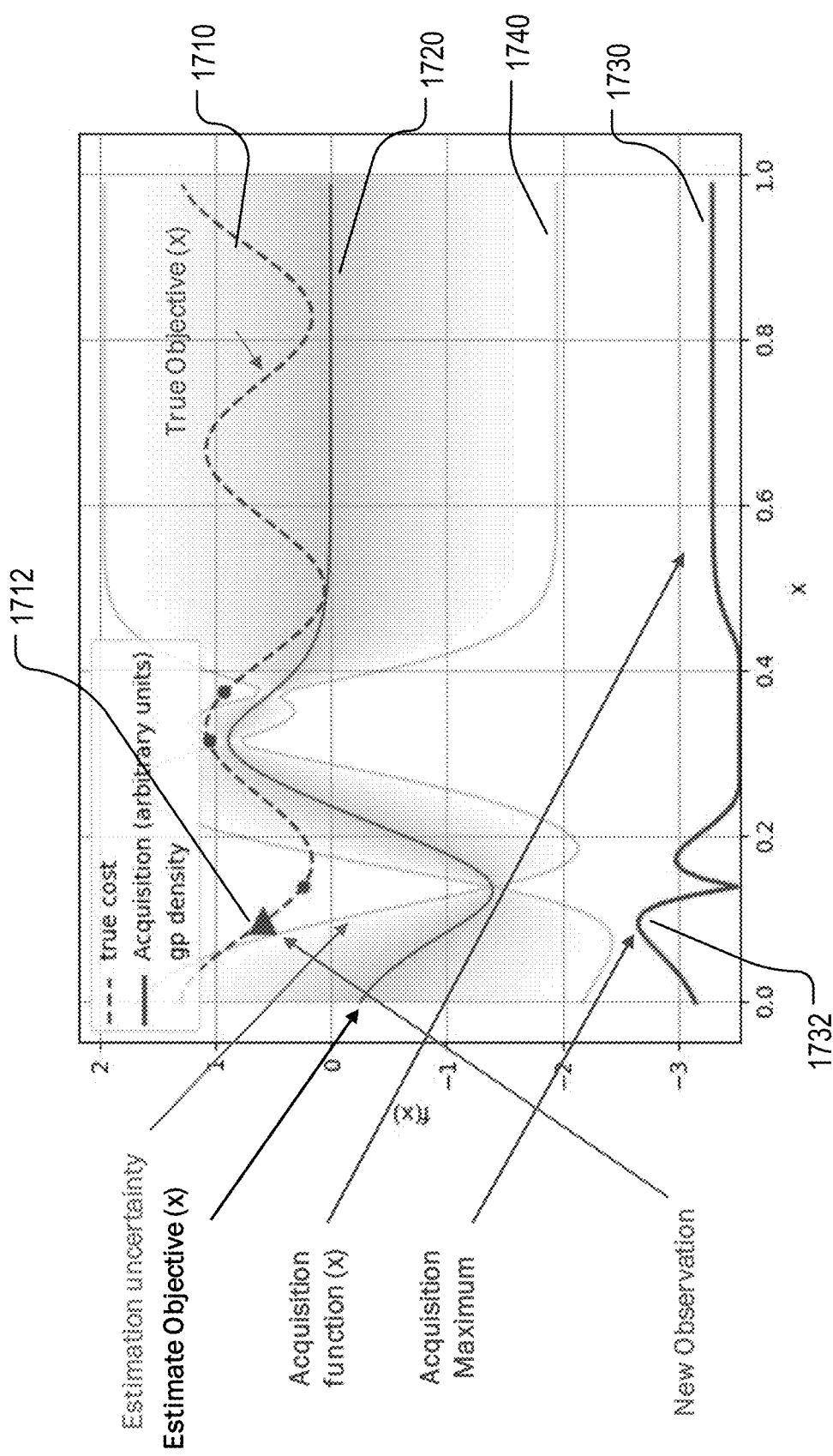
FIG. 17 shows an exemplary embodiment of the Bayesian optimization in FIG. 16.

FIG. 17 shows an example of curves representing a true cost 1710 that may be correspond to a true objective, an estimate objective function 1720, an acquisition function 1730, an estimation uncertainty 1740. The acquisition function 1730 may have a maximum 1732, and the corresponding sample will be selected as the point for a new observation 1712.

Figure 18:
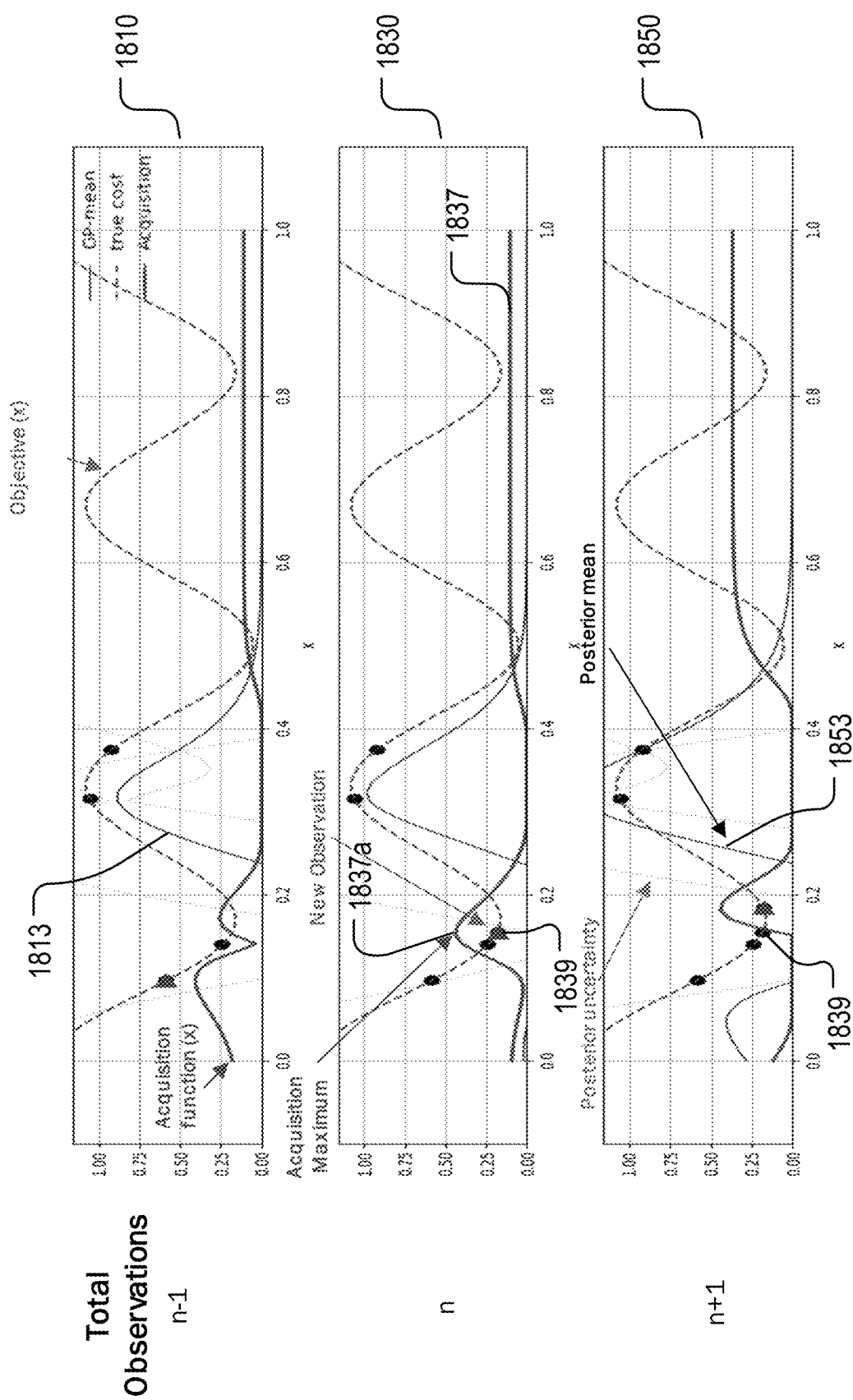
FIG. 18 shows another exemplary embodiment of the Bayesian optimization in FIG. 16.

FIG. 18 shows an example of three consecutive iterations of Bayesian optimization with three consecutive observations: total observation at a (n−1)th iteration 1810, total observation at a (n)th iteration 1830, and total observation at a (n+1)th iteration 1850.

In step 1610, the method may include fitting a Gaussian Process (GP) to data. Referring to FIG. 18, the method may include fitting a GP to data to obtain a GP mean curve 1813 for the total observation at the (n−1)th iteration 1810.

In step 1620, referring to FIG. 17, the method may include evaluating acquisition function 1730 based on GP. For another example, referring to FIG. 18, the method may include evaluating acquisition function for the total observation the (n)th iteration 1830 to obtain an acquisition function curve 1837.

In step 1630, referring to FIG. 17, the method may include selecting point that maximizes the acquisition function, which may be a maximum point 1732. For another example, referring to FIG. 18, the method may include selecting an acquisition maximum 1837a.

In step 1640, referring to FIG. 17, the method may include evaluating the objective at the new point 1712, wherein the new point may refer to a hyper-parameter set. For another example, referring to FIG. 18, the method may include obtaining an x value of the acquisition maximum 1837a. The x value of the acquisition maximum 1837a may refer to a new hyper-parameter set. The method may include constructing a new machine learning model based on the new hyper-parameter set, and evaluate the new machine learning model to obtain a new observation at the new point 1839, In step 1650, the method may include updating the new observation in Gaussian Process and then repeating step 1610. Referring to FIG. 18, in the total observation at the (n+1)th iteration 1850, the method may include updating the new observation 1839 in GP, and then repeating step 1610, which may include fitting GP to data to obtain a new GP mean curve 1853.

Figure 19:
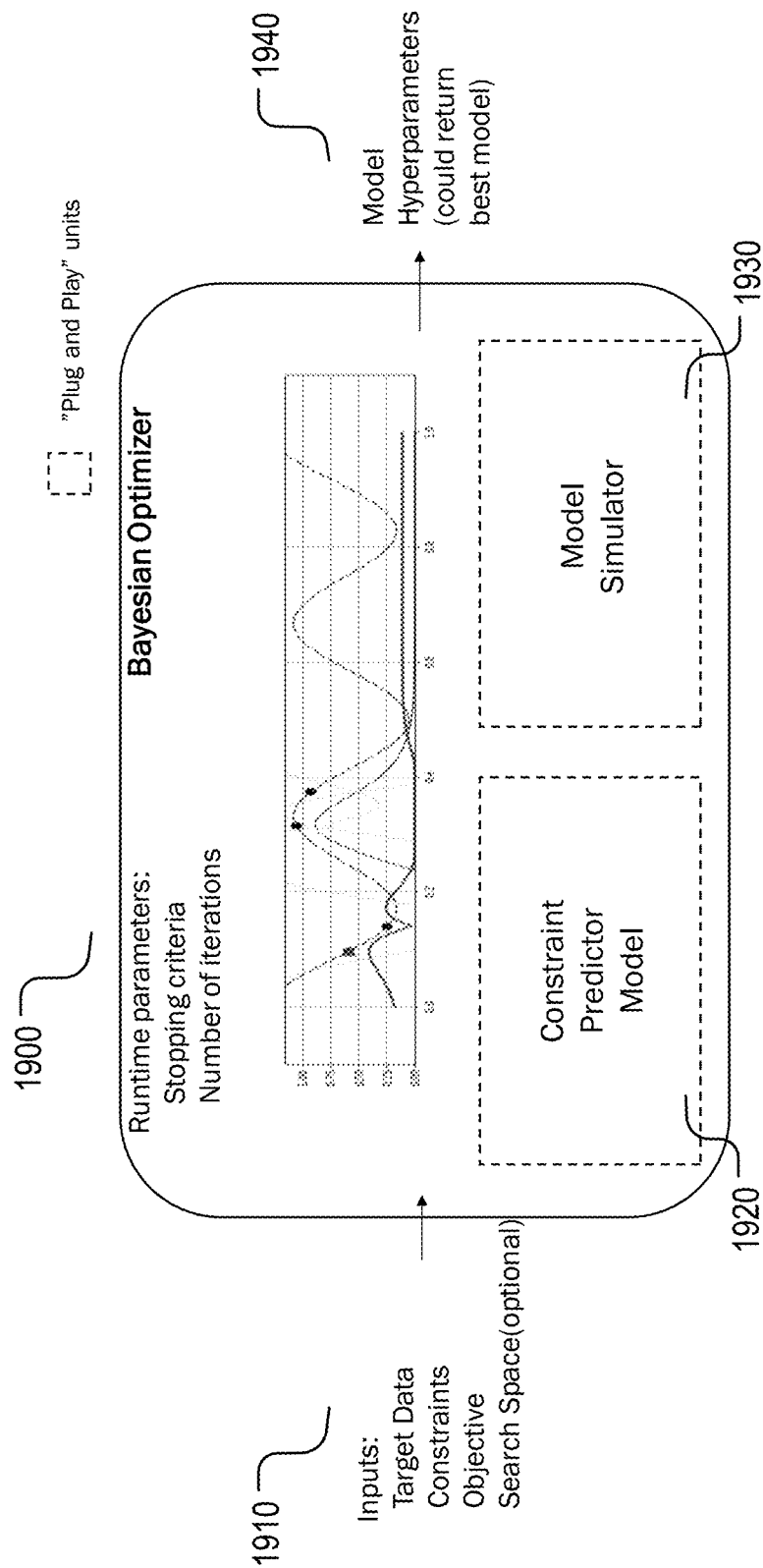
FIG. 19 shows an exemplary embodiment of a leverage modified Bayesian optimization.

The present disclosure describes a method of a leverage modified Bayesian optimization based on constraints. In the method, acquisition function may be used to implicitly constraint hyper-parameter search space of a Bayesian optimizer. Referring to FIG. 19, a leverage modified Bayesian optimization 1900 may include a constraint predictor model 1920 and/or a model simulator 1930. The leverage modified Bayesian optimization 1900 may receive input data 1910 and output a hyper-parameter set 1940. The constraint predictor model may depend on constraints in the input data 1910. In one implementation, the constraint predictor model 1920 and/or the model simulator 1930 is a plug and play unit.

A leverage modified Bayesian optimization may discourage exploration of constraint violation regions when constraint predictor exceeds defined constraints. For example, an acquisition function may be f(x) and a constraint predictor may be p(x, c), for x ∈ search space X, and c ∈ constraints C. The constraints may include hard constraints and/or soft constraints. For example, for the hard constraint in the constraints, the acquisition function may be set to zero in a hyper-parameter space corresponding to the hard constraint; for the soft constraint in the constraints, the acquisition function may be modified by using a penalizing function in a hyper-parameter space corresponding to the soft constraint. In one implementation, the hyper-parameter space may be obtained based on the constraint predictor p(x, c).

In one implementation, as an example for a hard constraint, the acquisition function may be modified as a resource-aware acquisition function (or a modified acquisition function):

$$\hat{f}(x) = \begin{cases} 0, & c < p(x, c) \\ f(x), & \text{otherwise} \end{cases}$$

In another implementation, as an example for a soft constraint, the resource-aware acquisition function may have a form of:

$$\hat{f}(x) = \begin{cases} g(f(x)), & c < p(x, c) \\ f(x), & \text{otherwise} \end{cases}$$

wherein g(f) is a penalizing function, which may generally be with increasing penalty.

Figure 20:
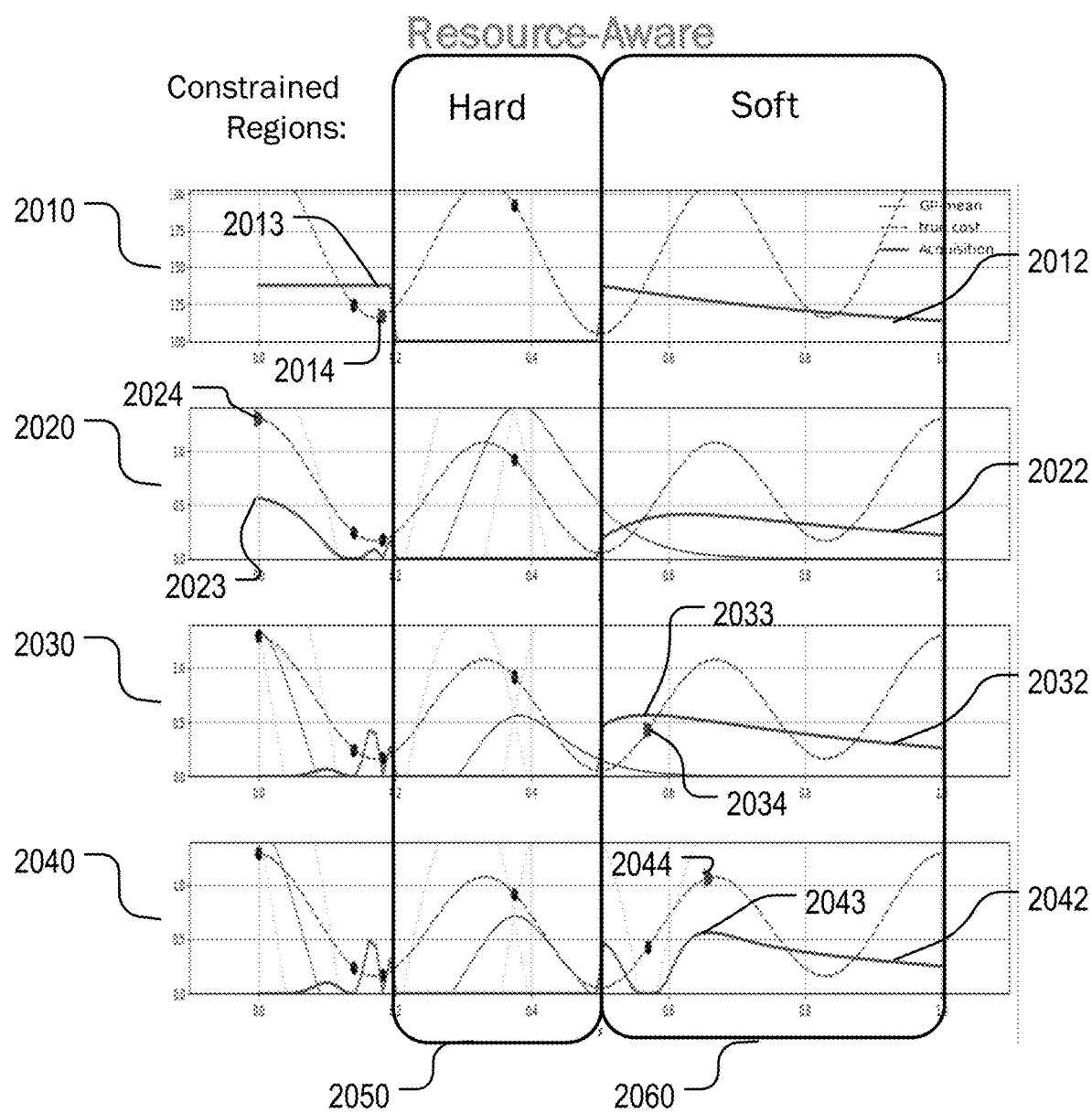
FIG. 20 shows another exemplary embodiment of a leverage modified Bayesian optimization.

FIG. 20 shows an example of four consecutive iterations of a modified Bayesian optimization with four consecutive observations: a first observation 2010, a second observation 2020, a third observation 2030, and a fourth observation 2040. The box 2050 shows a hyper-parameter space corresponding to one or more hard constraint, and the box 2060 shows another hyper-parameter space corresponding to one or more soft constraint.

Referring to FIG. 20, in the first observation 2010, a value of the acquisition function 2012 in box 2050 may be zero due to the one or more hard constraint. A value of the acquisition function 2012 in box 2060 may be modified by a penalizing function corresponding to the one or more soft constraint. During processing the first observation 2010, a point 2013 to maximize the acquisition function 2012 may be selected, and a new observation 2014 corresponding to the point 2013 may be obtained.

Referring to FIG. 20, in the second observation 2020, a value of the acquisition function 2022 in box 2050 may be zero due to the one or more hard constraint. A value of the acquisition function 2022 in box 2060 may be modified by a penalizing function corresponding to the one or more soft constraint. During processing the second observation 2020, a point 2023 to maximize the acquisition function 2022 may be selected, and a new observation 2024 corresponding to the point 2023 may be obtained.

Referring to FIG. 20, in the third observation 2030, a value of the acquisition function 2032 in box 2050 may be zero due to the one or more hard constraint. A value of the acquisition function 2032 in box 2060 may be modified by a penalizing function corresponding to the one or more soft constraint. During processing the third observation 2030, a point 2033 to maximize the acquisition function 2032 may be selected, and a new observation 2034 corresponding to the point 2033 may be obtained.

Referring to FIG. 20, in the fourth observation 2040, a value of the acquisition function 2042 in box 2050 may be zero due to the one or more hard constraint. A value of the acquisition function 2042 in box 2060 may be modified by a penalizing function corresponding to the one or more soft constraint. During processing the fourth observation 2040, a point 2043 to maximize the acquisition function 2042 may be selected, and a new observation 2044 corresponding to the point 2043 may be obtained.

Figure 21A:
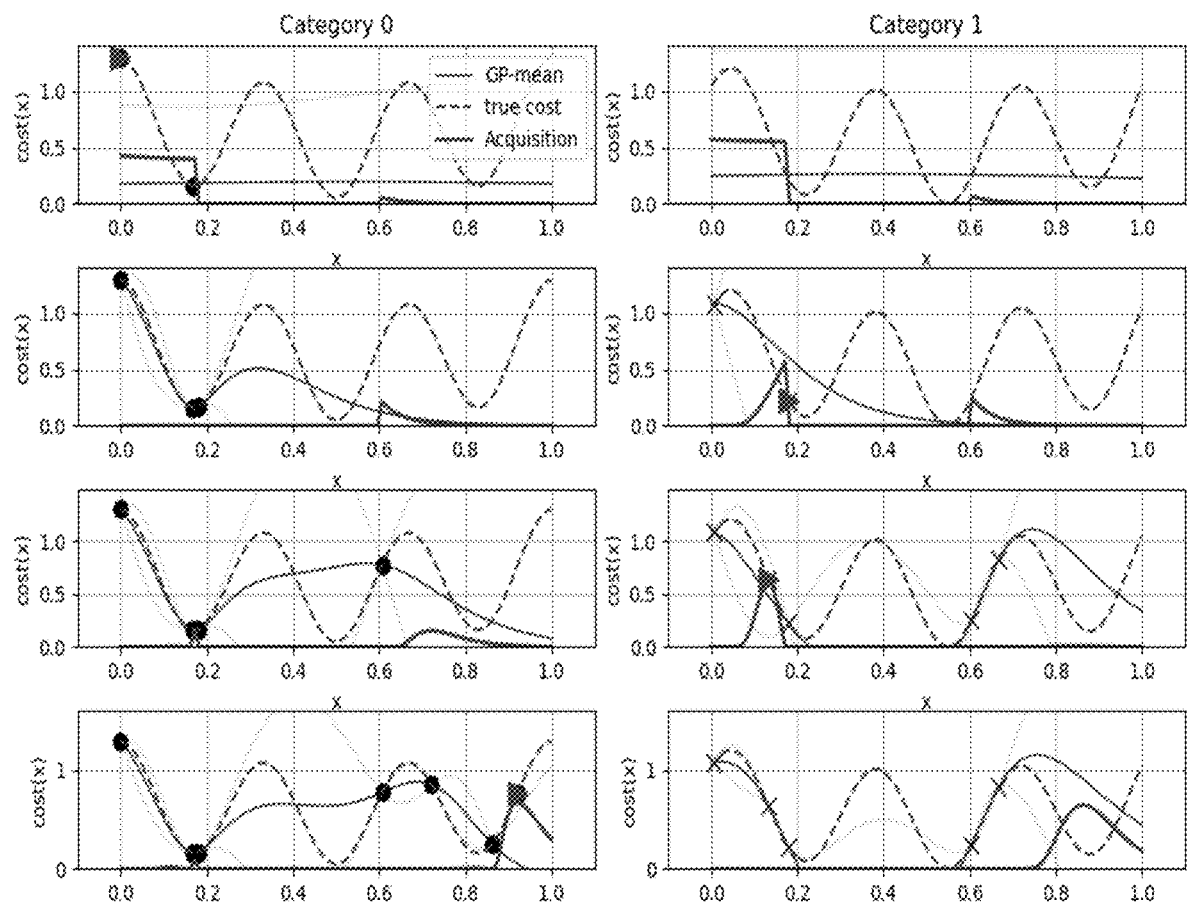
FIGS. 21A and 21B shows exemplary embodiments of a leverage modified Bayesian optimization.
Figure 21B:
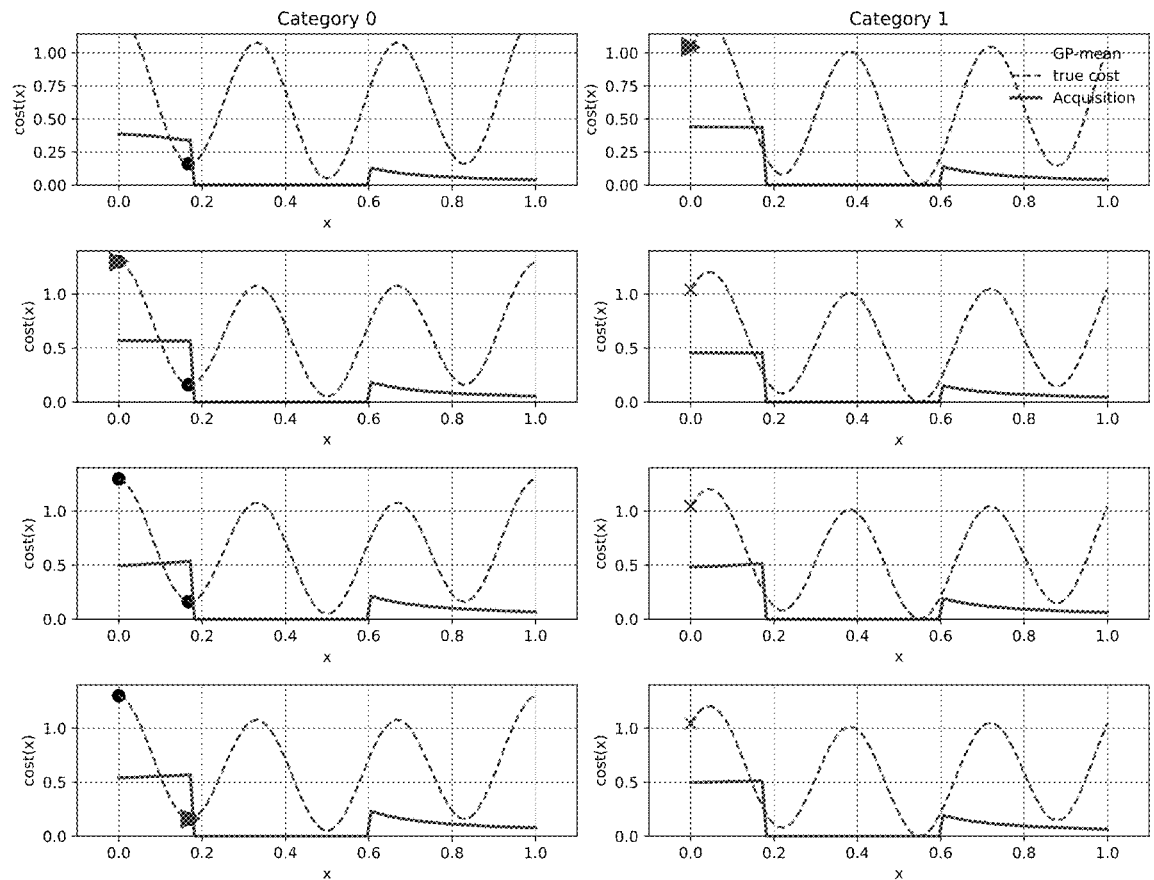

In another implementation, referring to FIGS. 21A and 21B, a leverage modified Bayesian optimization may be applied to multiple different acquisition functions. In another implementation, the leverage modified Bayesian optimization may optimize continuous, discrete and/or categorical variables.

A genetic algorithm may explore a large search space and find optimal solutions by mimicking evolution and natural selection. The genetic algorithm may be a clear way to evaluate fitness. In one implementation, a genetic algorithm may include a non-dominated solution genetic algorithm II (NSGAII).

Figure 22:
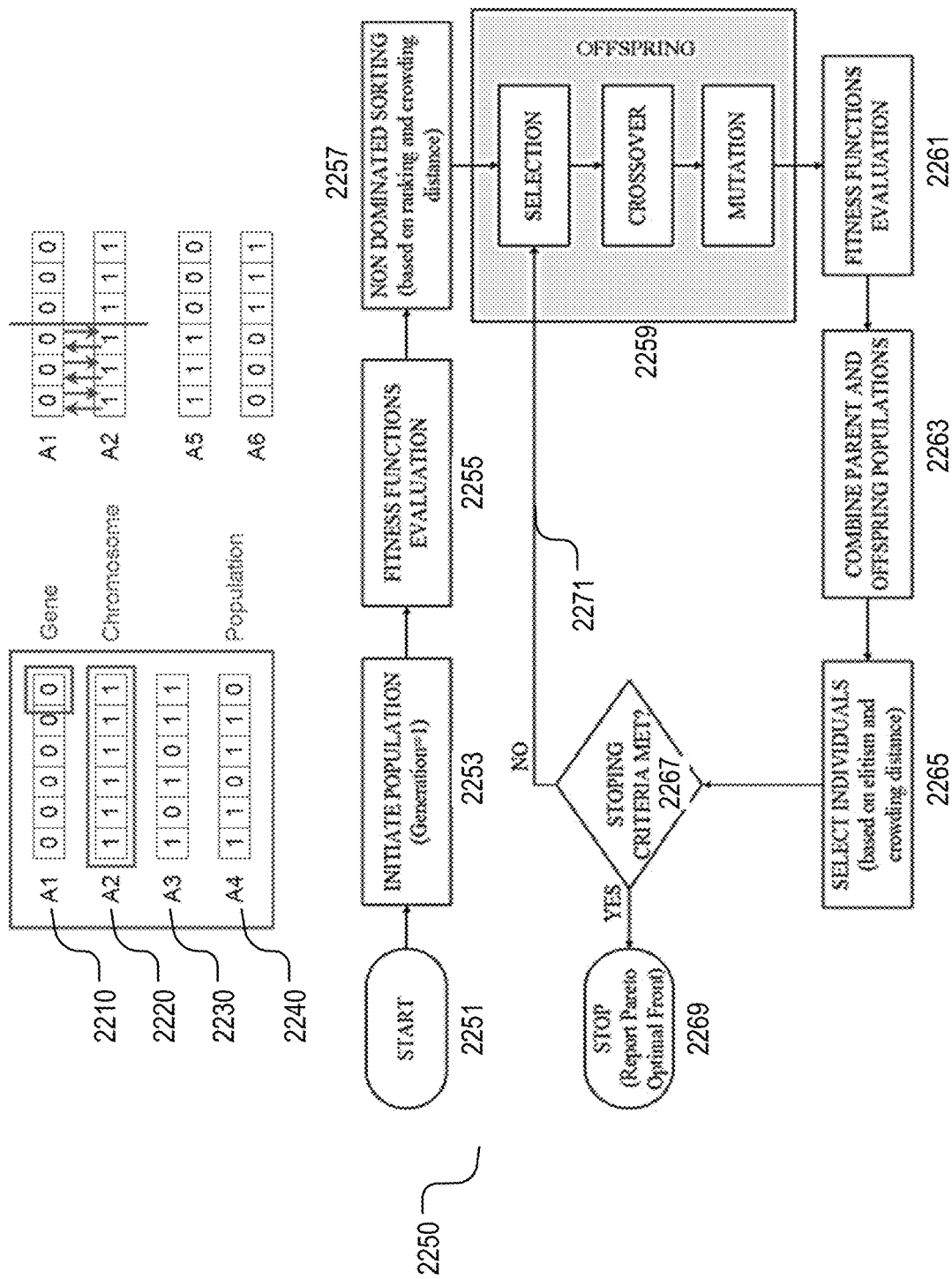
FIG. 22 shows an exemplary embodiment of a genetic algorithm.

A genetic algorithm may base on a principle of natural selection, wherein fittest individuals are selected for reproduction in order to produce offspring of the next generation. Referring to FIG. 22, the genetic algorithm may include a population (2230 and 2240). The population may include one or more chromosome 2220, and each chromosome may include one or more gene 2210.

FIG. 22 shows a flow diagram of a method 2250 for implementing a genetic algorithm. The method 2250 may include a portion or all of the following steps: step 2251, starting a genetic algorithm; step 2253, initiating a population in a first generation; step 2255, evaluating one or more fitness functions based on the population; step 2257, performing non dominated sorting based on ranking and crowding distance; step 2259, performing selection, crossover, and/or mutation of the population to obtain a offspring population, wherein the population may be a parent population; step 2261, evaluating fitness functions based on the offspring population; step 2263, combining the parent population and the offspring population; step 2265, select one or more individual members from a combined population based on elitism and crowding distance; step 2267, determining whether stopping criteria are met; step 2269, in response to the determination that the stopping criteria are met, stopping the genetic algorithm and reporting a Pareto Optimal Front; and step 2271, in response to the determination that the stopping criteria are not met, repeating next round of iteration with step 2259.

In one implementation, the genetic algorithm may use an elitist principle, wherein the elites of the population may be given the opportunity to be carried to the next generation. In another implementation, the genetic algorithm may use an explicit diversity preserving mechanism (or crowding distance). In another implementation, the genetic algorithm may emphasize a non-dominated solution.

In another embodiment, a multi-objective optimization and genetic algorithm may be used. In an example, there may be more than one objective functions, and each objective function may have a different individual optimal solution. Objective functions may be often conflicting (competing) to each other, and a set of trade-off optimal solutions instead of one optimal solution may be selected as "Pareto-optimal". No one solution may be considered to be better than any other with respect to all objective functions. "Pareto-front" may be a curve formed by joining all the Pareto-optimal solutions. In one implementation, Pareto-front provides a transparent set of trade-off candidates to a human user who may pick the 'BEST' solution considering their needs and the optimized metrics.

In another implementation, a multi-objective optimization and genetic algorithm may include a technique for order of preference by similarity to ideal solution (TOPSIS). The TOPSIS may be used to pick the "best solutions" from globally Pareto-optimal set.

Figure 23:
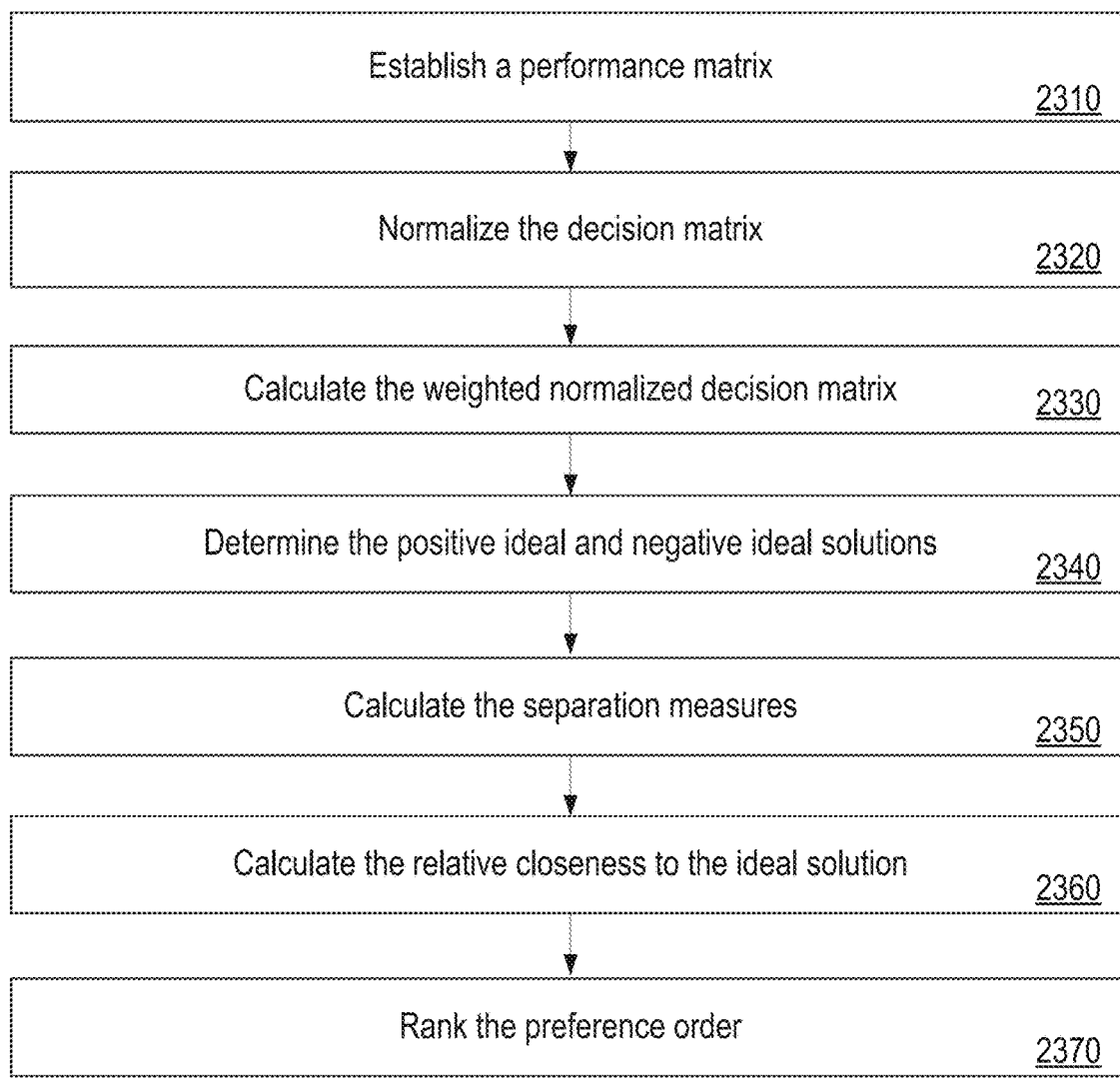
FIG. 23 shows a flow diagram of a method for a technique for order of preference by similarity to ideal solution (TOPSIS).
Figure 24:
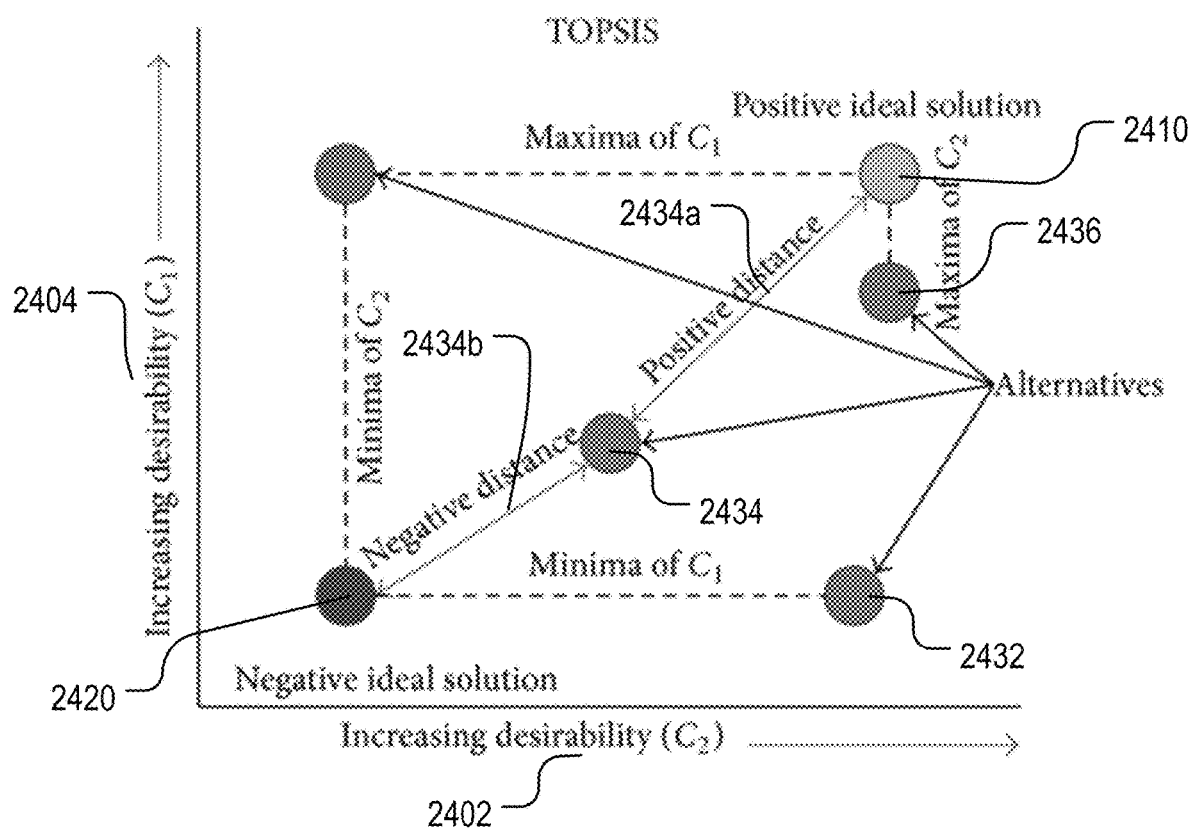
FIG. 24 shows an exemplary embodiment of the TOPSIS in FIG. 23.

Referring to FIGS. 23 and 24, a TOPSIS method 2300 may include a part or all of the following steps: step 2310: establish a performance matrix; step 2320: normalize the decision matrix; step 2330: calculate the weighted normalized decision matrix; step 2340: determine the positive ideal and negative ideal solutions; step 2350: calculate the separation measures; step 2360: calculate the relative closeness to the ideal solution; and step 2370: rank the preference order.

FIG. 24 shows a positive ideal solution 2410 and a negative ideal solution 2420. A horizontal axis 2402 may show a second increasing desirability ($C_2$), and a vertical axis 2404 may show a first increasing desirability ($C_1$). The first desirability and the second desirability may be used to quantify desirability of a first objective and desirability of a second objective, respectively. One or more alternatives (2430, 2432, 2434, or 2436) may be shown in their positions relative to the positive ideal solution 2410 and the negative ideal solution 2420. Taking one alternative 2434 as an example, the relative closeness between the alternative 2434 and the positive ideal solution 2410 may be obtained as a positive distance 2434a; and the relative closeness between the alternative 2434 and the negative ideal solution 2420 may be obtained as a negative distance 2434b.

Figure 25:
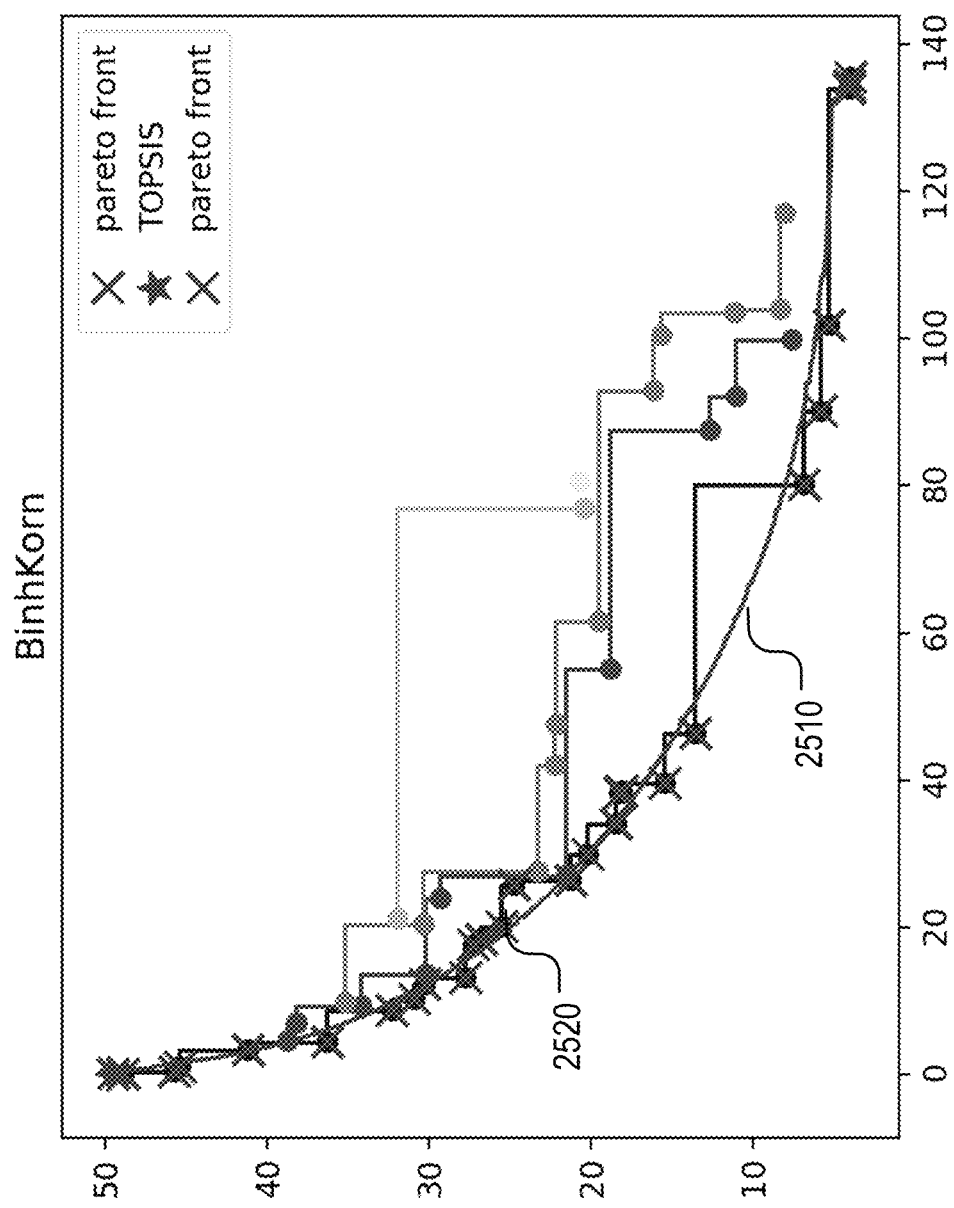
FIG. 25 shows an exemplary result of a multi-objective Bayesian optimization genetic algorithm (MOBOGA).

In another embodiment, referring to FIG. 25, multi-objective method such as a MOBOGA may be applied to a Binh and Korn function:

$$\text{Minimize} = \begin{cases} 4x^2 + 4y^2 \\ (x-5)^2 + (y-5)^2 \end{cases} \text{s.t.} \begin{cases} (x-5)^2 + y^2 \leq 25 \\ (x-8)^2 + (y+3)^2 \geq 7.7 \end{cases}$$

$$\text{wherein } 0 \leq x \leq 5, 0 \leq y \leq 3.$$

Referring to FIG. 25, an analytical solution 2510 and one point of a pareto front 2520 are shown.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A system comprising:
a non-transitory memory storing instructions executable to optimize hyper-parameters for a machine-learning model under constraints; and
a processor in communication with the non-transitory memory, wherein, the processor executes the instructions to cause the system to:
  obtain input data, the input data comprising a stopping criteria set, target data, and the constraints;
  obtain an initial hyper-parameter set and use the initial hyper-parameter set as a hyper-parameter set;
  for an iteration:
    generate and store a machine learning model, the machine learning model generated based on the hyper-parameter set,
    evaluate an output from execution of the machine learning model to obtain a performance metrics set, the output evaluated based on the target data,
    determine whether the performance metrics set satisfies the stopping criteria set,
    in response to determining that the performance metrics set satisfies the stopping criteria set:
      perform an exploitation process to obtain an optimal hyper-parameter set, and
      exit the iteration, and
    in response to determining that the performance metrics set does not satisfy the stopping criteria set:
      perform an exploration process to obtain a next hyper-parameter set by:
        obtaining an acquisition function based on a Bayesian optimization model and a constraint prediction model according to an iteration process,
        obtaining a Pareto front based on a multi-objective optimization model and the acquisition function, the multi-objective optimization model comprising a non-dominated sorting genetic algorithm II (NSGAII) model, and
        selecting the next hyper-parameter set based on a technique for order of preference by similarity to ideal solution (TOPSIS) model and the Pareto front, and
      perform a next iteration using the next hyper-parameter set as the hyper-parameter set;
  generate and deploy an optimized machine learning model based on the optimal hyper-parameter set; and
  execute the machine learning model to dynamically generate and output predictions based on a varying input dataset.

2. The system according to claim 1, wherein the instructions to cause the system to perform the exploitation process to obtain the optimal hyper-parameter set, comprises instructions to cause the system to:
obtain a Pareto front based on a multi-objective optimization model, the multi-objective optimization model comprising a NSGAII model; and
select the optimal hyper-parameter set based on a TOPSIS model and the Pareto front.

3. The system according to claim 1, further comprising instructions executed by the processor to cause the system to:
determine whether the next hyper-parameter set satisfies the stopping criteria set; and
in response to determining that the next hyper-parameter set satisfies the stopping criteria set:
  perform the exploitation process to obtain the optimal hyper-parameter set, and
  exit the iteration.

4. The system according to claim 1, wherein,
the constraints comprise at least one of a hard constraint or a soft constraint;
and wherein the instructions to cause the system to obtain the acquisition function based on the Bayesian optimization model and the constraint prediction model, further comprises instructions to cause the system to:
  in response to the hard constraint in the constraints, set the acquisition function to zero in a hyper-parameter space corresponding to the hard constraint; and
  modify the acquisition function, in response to the soft constraint in the constraints, using a penalizing function in a hyper-parameter space corresponding to the soft constraint.

5. The system according to claim 4, wherein the instructions to cause the system to modify the acquisition function, in response to the soft constraint in the constraints, using the penalizing function in the hyper-parameter space corresponding to the soft constraint, comprises instructions to cause the system to,
modify the acquisition function as having a form of:

$$\hat{f}(x) = \begin{cases} g(f(x)), & c < p(x, c) \\ f(x), & \text{otherwise} \end{cases}$$

wherein:
g(f) is the penalizing function,
f(x) is the acquisition function,
f̂(x) is the modified acquisition function, and
p(x, c) is a constraint predictor, for x ∈ a search space X, and c ∈ constraints C.

6. The system according to claim 1, wherein the instructions to cause the system to obtain the acquisition function based on the Bayesian optimization model and the constraint prediction model, comprises instructions to cause the system to,
fit a Gaussian Process (GP) to data;
evaluate the acquisition function based on the GP;
select a point maximizing the acquisition function;
evaluate an objective at the point; and
update a new observation in GP and repeat fitting GP to the data.

7. A method comprising:
obtaining, by a device comprising a memory storing instructions for use in optimizing hyper-parameters for a machine-learning model under constraints and a processor in communication with the memory, input data, the input data comprising a stopping criteria set, target data, and the constraints;
obtaining, by the device, an initial hyper-parameter set and using the initial hyper-parameter set as a hyper-parameter set;
for an iteration:
generating and storing, by the device, a machine learning model, the machine learning model generated based on the hyper-parameter set,
evaluating, by the device, an output from execution of the machine learning model to obtain a performance metrics set, the output evaluated based on the target data,
determining, by the device, whether the performance metrics set satisfies the stopping criteria set,
in response to determining that the performance metrics set satisfies the stopping criteria set:
performing, by the device, an exploitation process to obtain an optimal hyper-parameter set, and
exiting, by the device, the iteration, and
in response to determining that the performance metrics set does not satisfy the stopping criteria set:
performing, by the device, an exploration process to obtain a next hyper-parameter set by:
obtaining an acquisition function based on a Bayesian optimization model and a constraint prediction model according to an iteration process,
obtaining a Pareto front based on a multi-objective optimization model and the acquisition function, the multi-objective optimization model comprising a non-dominated sorting genetic algorithm II (NSGAII) model, and
selecting the next hyper-parameter set based on a technique for order of preference by similarity to ideal solution (TOPSIS) model and the Pareto front, and
performing, by the device, a next iteration with using the next hyper-parameter set as the hyper-parameter set;
generating and deploying, by the device, an optimized machine learning model based on the optimal hyper-parameter set; and
executing, by the device, the machine learning model to dynamically generate and output predictions based on a varying input dataset.

8. The method according to claim 7, wherein performing the exploitation process to obtain the optimal hyper-parameter set comprises:
obtaining, by the device, a Pareto front based on a multi-objective optimization model, the multi-objective optimization model comprising a NSGAII model; and
selecting, by the device, the optimal hyper-parameter set based on a TOPSIS model and the Pareto front.

9. The method according to claim 7, the method further comprising:
determining, by the device, whether the next hyper-parameter set satisfies the stopping criteria set; and
in response to determining that the next hyper-parameter set satisfies the stopping criteria set:
performing, by the device, the exploitation process to obtain the optimal hyper-parameter set, and
exiting, by the device, the iteration.

10. The method according to claim 7, wherein:
the constraints comprise at least one of a hard constraint or a soft constraint;
obtaining the acquisition function based on the Bayesian optimization model and the constraint prediction model comprises:
in response to the hard constraint in the constraints, setting, by the device, the acquisition function to be zero in a hyper-parameter space corresponding to the hard constraint; and
in response to the soft constraint in the constraints, modifying, by the device, the acquisition function by using a penalizing function in a hyper-parameter space corresponding to the soft constraint.

11. The method according to claim 10, wherein, in response to the soft constraint in the constraints, the modifying the acquisition function by using the penalizing function in the hyper-parameter space corresponding to the soft constraint, comprises:
modifying the acquisition function as having a form of:

$$\hat{f}(x) = \begin{cases} g(f(x)), & c < p(x, c) \\ f(x), & \text{otherwise} \end{cases}$$

wherein:
g(f) is the penalizing function,
f(x) is the acquisition function,
f̂(x) is the modified acquisition function, and
p(x, c) is a constraint predictor, for x ∈ a search space X, and c ∈ constraints C.

12. The method according to claim 7, wherein the obtaining the acquisition function based on the Bayesian optimization model and the constraint prediction model, comprises:
fitting a Gaussian Process (GP) to data;
evaluating the acquisition function based on the GP;
selecting a point maximizing the acquisition function;
evaluating an objective at the point; and
updating a new observation in GP and repeating fitting GP to the data.

13. A product comprising:
machine-readable media other than a transitory signal;
instructions stored on the machine-readable media for optimizing hyper-parameters for a machine-learning model under constraints; and
wherein when a processor executes the instructions, the product is configured to:
  obtain input data, the input data comprising a stopping criteria set, target data, and the constraints;
  obtain an initial hyper-parameter set and use the initial hyper-parameter set as a hyper-parameter set;
  for an iteration:
    generate and store a machine learning model, the machine learning model generated based on the hyper-parameter set,
    evaluate an output from execution of the machine learning model to obtain a performance metrics set, the output evaluated based on the target data,
    determine whether the performance metrics set satisfies the stopping criteria set,
    in response to determining that the performance metrics set satisfies the stopping criteria set:
      perform an exploitation process to obtain an optimal hyper-parameter set, and
      exit the iteration, and
    in response to determining that the performance metrics set does not satisfy the stopping criteria set:
      perform an exploration process to obtain a next hyper-parameter set by:
        obtaining an acquisition function based on a Bayesian optimization model and a constraint prediction model according to an iteration process,
        obtaining a Pareto front based on a multi-objective optimization model and the acquisition function, the multi-objective optimization model comprising a non-dominated sorting genetic algorithm II (NSGAII) model, and
        selecting the next hyper-parameter set based on a technique for order of preference by similarity to ideal solution (TOPSIS) model and the Pareto front, and
      perform a next iteration with using the next hyper-parameter set as the hyper-parameter set;
  generate and deploy an optimized machine learning model based on the optimal hyper-parameter set; and
  execute the machine learning model to dynamically generate and output predictions based on a varying input dataset.

14. The product according to claim 13, wherein, performance of the exploitation process to obtain the optimal hyper-parameter set, further comprises the product being configured to:
  obtain a Pareto front based on a multi-objective optimization model, the multi-objective optimization model comprising a NSGAII model; and
  select the optimal hyper-parameter set based on a TOPSIS model and the Pareto front.

15. The product according to claim 13, wherein, when the processor executes the instructions, the product is further configured to:
  determine whether the next hyper-parameter set satisfies the stopping criteria set; and
  in response to determining that the next hyper-parameter set satisfies the stopping criteria set:
    perform the exploitation process to obtain the optimal hyper-parameter set, and
    exit the iteration.

16. The product according to claim 13, wherein,
  the constraints comprise at least one of a hard constraint or a soft constraint;
  and wherein the product configured to obtain the acquisition function based on the Bayesian optimization model and the constraint prediction model, further comprises the product being configured to:
    set, in response to the hard constraint in the constraints, the acquisition function to zero in a hyper-parameter space corresponding to the hard constraint; and
    modify the acquisition function, in response to the soft constraint in the constraints, with a penalizing function in a hyper-parameter space corresponding to the soft constraint.

17. The product according to claim 16, wherein the product being configured to modify the acquisition function, in response to the soft constraint in the constraints, with the penalizing function in the hyper-parameter space corresponding to the soft constraint, comprises the product being configured to,
  modify the acquisition function as having a form of:

$$\acute{f}(x) = \begin{cases} g(f(x)), & c < p(x, c) \\ f(x), & \text{otherwise} \end{cases}$$

wherein:
  g(f) is the penalizing function,
  f(x) is the acquisition function,
  f́(x) is the modified acquisition function, and
  p(x, c) is a constraint predictor, for $x \in$ a search space X, and $c \in$ constraints C.